US009812691B2

(12) United States Patent
Wu

(10) Patent No.: US 9,812,691 B2
(45) Date of Patent: Nov. 7, 2017

(54) TERMINAL ASSEMBLY, POWER MODULE INCLUDING THE SAME, SPINDLE BODY INCLUDING THE SAME, AND ELECTRIC DEVICE INCLUDING THE SAME

(71) Applicant: Chun-Hung Wu, New Taipei (TW)

(72) Inventor: Chun-Hung Wu, New Taipei (TW)

( * ) Notice: Subject to any disclaimer, the term of this patent is extended or adjusted under 35 U.S.C. 154(b) by 858 days.

(21) Appl. No.: 14/149,239

(22) Filed: Jan. 7, 2014

(65) Prior Publication Data
US 2015/0099162 A1 Apr. 9, 2015

(30) Foreign Application Priority Data
Oct. 4, 2013 (TW) .............................. 102218670 U

(51) Int. Cl.
| | |
|---|---|
| H01M 2/30 | (2006.01) |
| H01M 2/02 | (2006.01) |
| H01M 2/10 | (2006.01) |
| H01M 2/20 | (2006.01) |
| H01M 10/04 | (2006.01) |
| H01R 11/28 | (2006.01) |

(52) U.S. Cl.
CPC ............ *H01M 2/30* (2013.01); *H01M 2/022* (2013.01); *H01M 2/105* (2013.01); *H01M 2/1022* (2013.01); *H01M 2/1094* (2013.01); *H01M 2/204* (2013.01); *H01M 10/0436* (2013.01); *H01R 11/288* (2013.01); *H01M 2220/30* (2013.01)

(58) Field of Classification Search
CPC ......... H01R 11/28; H01M 2/10; H01M 2/202; H01M 2/307

USPC .......................... 429/121, 123, 151, 158–160
See application file for complete search history.

(56) References Cited

U.S. PATENT DOCUMENTS

2002/0006544 A1* 1/2002 Asaka ...................... H01G 9/26
429/99

FOREIGN PATENT DOCUMENTS

| CN | 201022087 | 2/2008 |
|---|---|---|
| CN | 101290999 | 10/2008 |
| CN | 103069627 | 4/2013 |

(Continued)

OTHER PUBLICATIONS

An Office Action from the corresponding Chinese application, mailed May 24, 2016, 5 pages.

*Primary Examiner* — James Lee
(74) *Attorney, Agent, or Firm* — Muncy, Geissler, Olds & Lowe, P.C.

(57) ABSTRACT

A continuable power module includes at least one battery. The battery includes a main body, a first electrode terminal, a second electrode terminal and a conducting terminal. The main body includes a connecting end and a continuing end opposite to the connecting end. The first electrode terminal is disposed at the connecting end, and the second electrode terminal is disposed at the continuing end. The structure of the second electrode terminal matches the structure of the first electrode terminal. The conducting terminal includes a secured end and a free end. The secured end is disposed at the continuing end, and the free end is detachably connected to the first electrode terminal. The conducting terminal is connected electrically to the first electrode terminal via the free end, such that the continuing end of the one battery is connected to the connecting end of another battery.

15 Claims, 19 Drawing Sheets

(56) References Cited

FOREIGN PATENT DOCUMENTS

| | | |
|---|---|---|
| EP | 2296212 A1 | 3/2011 |
| JP | 2009188095 | 8/2009 |

\* cited by examiner

TERMINAL ASSEMBLY, POWER MODULE INCLUDING THE SAME, SPINDLE BODY INCLUDING THE SAME, AND ELECTRIC DEVICE INCLUDING THE SAME

CROSS-REFERENCES TO RELATED APPLICATIONS

This non-provisional application claims priority under 35 U.S.C. §119(a) on Patent Application No. 102218670 filed in Taiwan, R.O.C. on 2013 Oct. 4, the entire contents of which are hereby incorporated by reference.

BACKGROUND

Technical Field

The disclosure relates to a battery module, and particularly to a continuable power module in which the number of the batteries thereof can be increased or reduced according to user's requirements.

Related Art

Due to the invention of batteries, the power of electric appliances is no longer dependent on the supply mains, such that the electric appliances can be operated in different occasions and environments, thereby significantly increasing the usefulness of the electric appliances.

However, even batteries with the same voltage may be of different sizes and/or shapes, so that the user finds it difficult to choose the proper battery for their device. For instance, for two electric razors operating at 6 volts, the batteries used might be different due to the difference between the brands or the receiving spaces for the batteries.

In addition, the voltage requirements for different electric appliances may not be the same, and the voltage provided by a single battery is fixed, such that several batteries are connected to each other in a head-to-tail manner firstly to meet the operation voltage of the electric appliance, and then the connected batteries are connected electrically to the electric appliance. In view of this, since there is no structure for fastening one battery with another, a battery receiving groove with enough structural strength is essential for the electric appliance, so that the batteries received and positioned within the electric appliance can be connected electrically to each other and drive the electric appliance.

Additionally, the batteries are separated from outer circumstances via the battery receiving groove, such that water or dust will not make influence to the electrical connections of the batteries; conversely, when the batteries are not received in the battery receiving groove, there is no any waterproof or dustproof design for the electrical connections of the batteries.

SUMMARY

In view of this, one invention concept of the disclosure provides a continuable power module including at least one battery. The battery includes a main body, a first electrode terminal, a second electrode terminal, and a conducting terminal. The main body includes a connecting end and a continuing end opposite to the connecting end. The first electrode terminal is disposed at the connecting end, and the second electrode terminal is disposed at the continuing end. The structure of the second electrode terminal matches that of the first electrode terminal. The conducting terminal includes a secured end and a free end. The secured end is disposed at the continuing end, and the free end is detachably connected to the first electrode terminal. The conducting terminal is connected electrically to the first electrode terminal via the free end, such that the continuing end of the one battery is connected to the connecting end of another battery.

Another invention concept provides an electric device including a shell, a working circuit, and a continuable power module. The shell includes a battery receiving groove. The working circuit is disposed in the shell and includes a power accepting end. The continuable power module includes at least one battery. The battery includes a main body, a first electrode terminal, a second electrode terminal, and a conducting terminal. The main body includes a connecting end and a continuing end opposite to the connecting end. The first electrode terminal is disposed at the connecting end, and the second electrode terminal is disposed at the continuing end. The structure of the second electrode terminal matches that of the first electrode terminal. The conducting terminal includes a secured end and a free end. The secured end is disposed at the continuing end, and the free end is detachably connected to the first electrode terminal. The conducting terminal is connected electrically to the first electrode terminal via the free end. The continuable power module is received in the battery receiving groove. The power accepting end is connected electrically to the second electrode terminal and the conducting terminal of the battery which is at the end of the continuable power module.

Yet another invention concept provides a terminal assembly comprising a male terminal structure and a female terminal structure. The male terminal structure comprises a male terminal body, a first terminal member, and a free terminal member. The first terminal member is disposed at an end portion of the male terminal body. The free terminal member is detachably connected to the first terminal member. The female terminal structure comprises a female terminal body, a second terminal member, and a secured terminal member. The second terminal member is disposed at an end portion of the female terminal body. A structure of the second terminal member matches with a structure of the first terminal member, so that the second terminal member is connectable to the first terminal member. The secured terminal member is disposed at the end portion of the female terminal body and spaced from the second terminal member. When the male terminal structure is connected to the female terminal structure, the first terminal member is connected to the second terminal member, and the second terminal member pushes the free terminal member apart from the first terminal member, so that the free terminal member is connected to the secured terminal member.

In one embodiment, the male terminal structure comprises a positioning portion and a positioning structure, and the female terminal structure comprises a limiting portion, a void, and a limiting structure. The positioning portion is recessed at a center of the male terminal body for receiving the first terminal member and the free terminal member. The positioning structure is annularly disposed at an inner wall of the positioning portion. The limiting portion is protruded from a center of the female terminal body for matching with the positioning portion of the male terminal structure. The void is disposed at a center of the limiting portion for receiving the second terminal member and the second terminal member. The limiting structure is annularly disposed at an outer wall of the limiting portion for matching with the positioning structure of the male terminal structure.

In one embodiment, the terminal assembly further comprises a water elastomer at the female terminal body and placed within the second terminal member. The waterproof elastomer defines a channel therethrough, and the inner diameter of the channel is less than the outer diameter of the first terminal member. When the male terminal structure is connected to the female terminal structure, the first terminal member is inserted into the channel of the waterproof elastomer, and the periphery of the first terminal member is enclosed by the inner wall of the channel of the waterproof elastomer.

In one embodiment, the terminal assembly further comprises a flexible compressible member fitted over the secured terminal member. When the male terminal structure is connected to the female terminal structure, the flexible compressible member is compressed inward along the secured terminal member.

In one embodiment, the terminal assembly further comprises an insulating member disposed between the second terminal member and the secured terminal member.

Further yet another invention concept provides a power module comprising the aforementioned terminal assembly, a first battery connected with the male terminal structure, and a second battery connected with the female terminal structure.

In one embodiment, the power module further comprises a second waterproof member disposed between the first battery and the second battery.

In one embodiment, the male terminal structure of the terminal assembly comprises a positioning portion and a positioning structure, and the female terminal structure of the terminal assembly comprises a limiting portion, a void, and a limiting structure. The positioning portion is recessed at a center of the male terminal body for receiving the first terminal member and the free terminal member. The positioning structure is annularly disposed at an inner wall of the positioning portion. The limiting portion is protruded from a center of the female terminal body for matching with the positioning portion of the male terminal structure. The void is disposed at a center of the limiting portion for receiving the second terminal member and the second terminal member. The limiting structure is annularly disposed at an outer wall of the limiting portion for matching with the positioning structure of the male terminal structure.

In one embodiment, the male terminal structure of the terminal assembly comprises a limiting portion, a void, and a limiting structure, and the female terminal structure of the terminal assembly comprises a positioning portion and a positioning structure. The limiting portion is protruded from a center of the female terminal body. The void is disposed at a center of the limiting portion for receiving the second terminal member and the second terminal member. The limiting structure is annularly disposed at an outer wall of the limiting portion. The positioning portion is recessed at a center of the male terminal body for receiving the first terminal member and the free terminal member and matching with the limiting portion of the male terminal structure. The positioning structure is annularly disposed at an inner wall of the positioning portion for matching with the limiting structure of the male terminal structure.

In one embodiment, the power module further a waterproof elastomer disposed in the second terminal member of the terminal assembly.

In one embodiment, the power module further comprises a flexible compressible member fitted over the secured terminal member. When the male terminal structure is connected to the female terminal structure, the flexible compressible member is compressed inward along the secured terminal member.

In one embodiment, the power module further comprises an insulating member disposed between the second terminal member and the secured terminal member.

In one embodiment, the power module further comprises a base member. The base member comprises a base body, a first contacting terminal, a second contacting terminal, and a battery core. The base body comprises a linking end. The first contacting terminal is disposed at the linking end. A structure of the first contacting terminal is substantially the same as the structure of the second terminal member and matching with the structure of the terminal member. The second contacting terminal is disposed at the linking end and connected electrically to the first contacting terminal. A structure of the second contacting terminal is substantially the same as a structure of the secured terminal member and matching with a structure of the free terminal member. The battery is connected electrically to the first contacting terminal and the second contacting terminal.

Yet still another invention concept provides a spindle body comprising the aforementioned terminal assembly, a first block body connected with the male terminal structure, a second block body connected with the female terminal structure, and a spindle member, wherein two ends of the spindle member are respectively connected to the first block body and the second block body.

Yet further still another invention concept provides an electric device comprising a shell, a working circuit, and a power module. The shell comprises a battery receiving groove. The working circuit is disposed in the shell. The power module comprises a battery, and the battery comprises the aforementioned terminal assembly. Wherein, the power module is disposed in the battery receiving groove, the working circuit is connected electrically to the power module.

According to the disclosure, the battery of continuable power module can be connected to each other, and the number of the batteries of the continuable power module can be altered so as to adjust the outputted voltage to match with the operating voltage of the electric appliance. Additionally, the continuable power module is waterproofed, so that the electric appliances applied thereto can be operated under water or on rainy days, thereby enhancing the usefulness of the electric appliances. Furthermore, via the application of the spindle body, the continuable power module is bendable, twistable and foldable, so that the continuable power module can be even received in irregular and small spaces.

The detailed features and advantages of the disclosure are described below in great detail through the following embodiments, the content of the detailed description is sufficient for those skilled in the art to understand the technical content of the disclosure and to implement the disclosure there accordingly. Based upon the content of the specification, the claims, and the drawings, those skilled in the art can easily understand the relevant objectives and advantages of the disclosure.

BRIEF DESCRIPTION OF THE DRAWINGS

The disclosure will become more fully understood from the detailed description given herein below for illustration only and thus not limitative of the disclosure, wherein.

DETAILED DESCRIPTION

Figure 1:
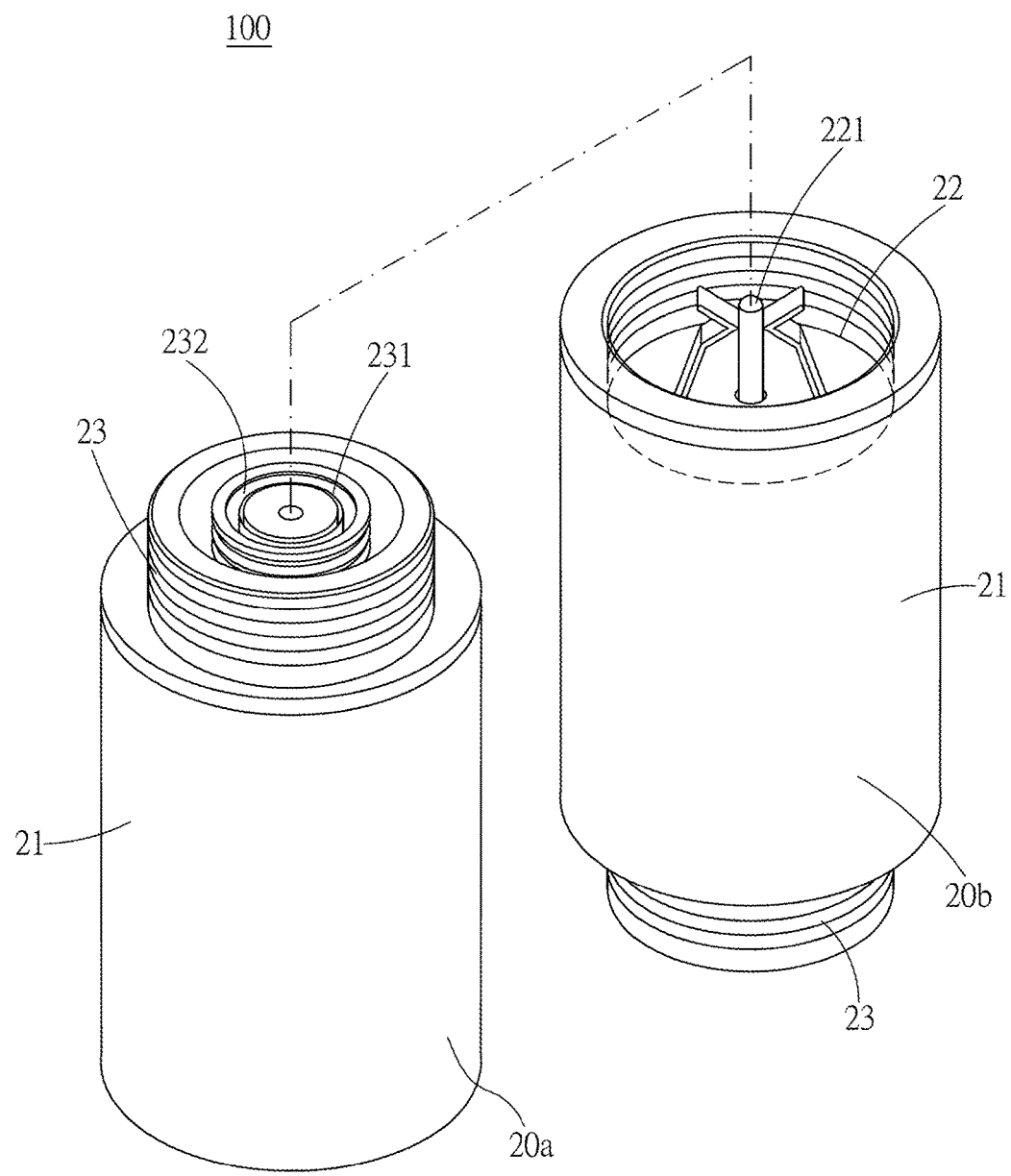
FIG. 1 is a perspective view of a continuable power module of a first embodiment of the disclosure.

Hereinafter, for convenience, the term "electric device" is substantially the same as the term "electronic device"; and the term "electric appliance" is substantially the same as the term "electronic appliance".

Please refer to FIGS. 1-4, which are a perspective view, a partial enlarged view, partial cross-sectional views of a continuable power module 100, operating schematic views of a waterproof elastomer 32 thereof, and an operating schematic view of the continuable power module 100, of a first embodiment of the disclosure. The continuable power module 100 includes at least one battery 20 capable of being received in a battery receiving groove of an electric appliance so as to offer electricity for the electric appliance. Additionally, the operating voltages for different electric appliances would not be the same, so that the number of the batteries 20 for operating the electric appliances is adjustable case by case. Hereinafter, for ease of reading and recognition, battery 20 is the generic term of battery 20a and battery 20b; that is, although some figures and some paragraphs only mention about battery 20a, it is also applicable for battery 20b and battery 20.

Figure 2:
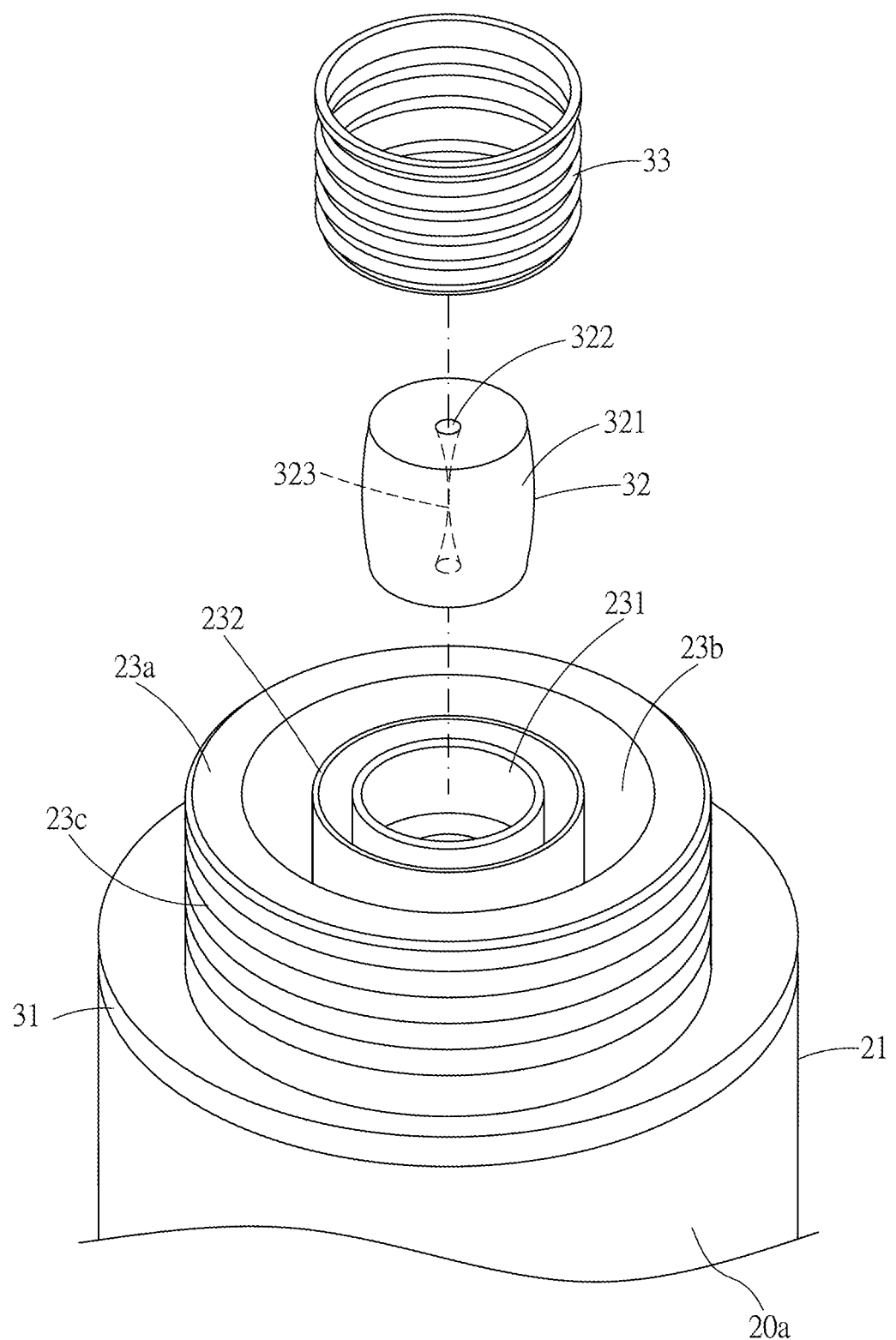
FIG. 2 is a partial enlarged perspective view of the continuable power module of the first embodiment of the disclosure.
Figure 4:
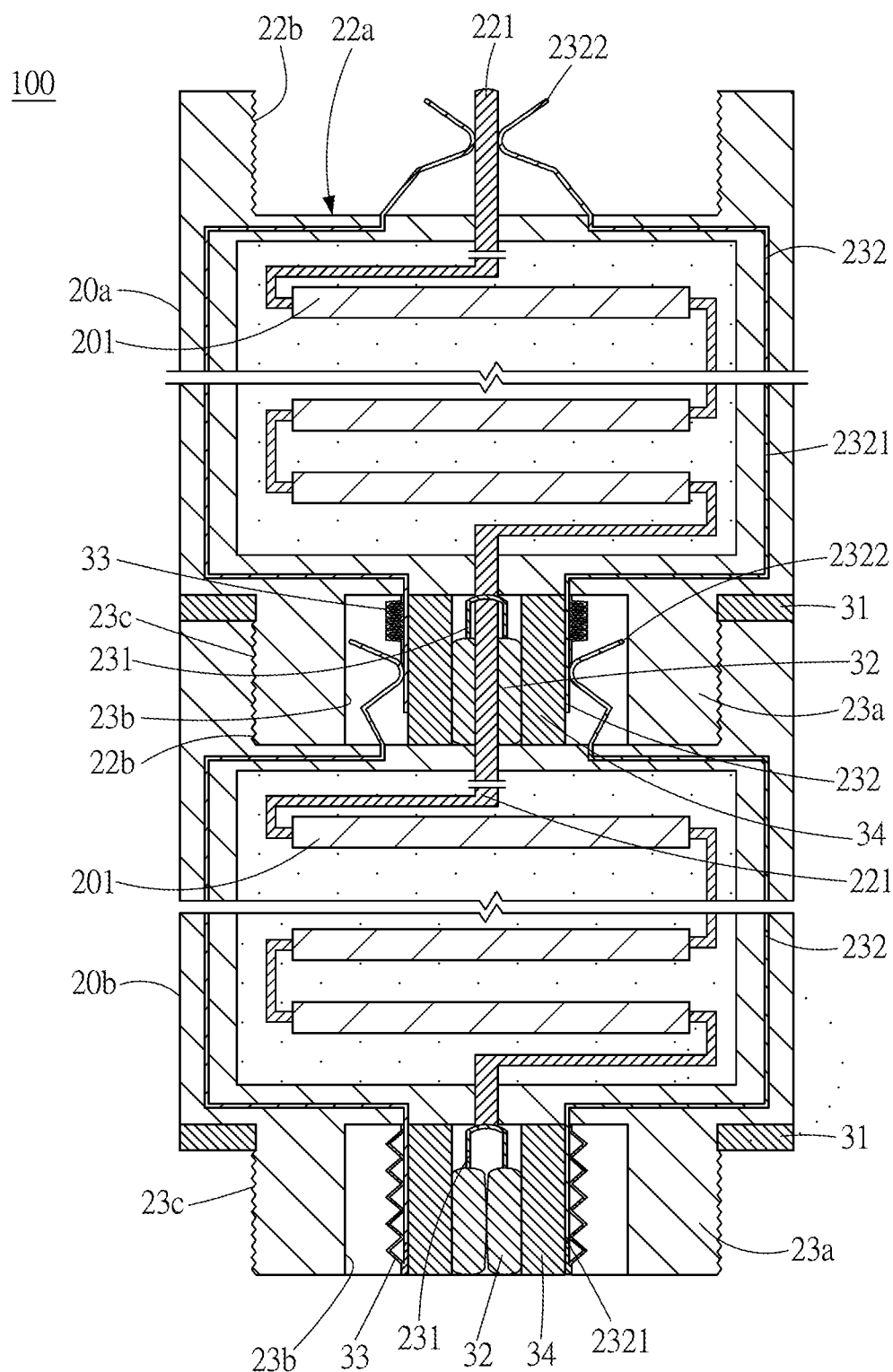
FIG. 4 is an operating schematic view of the continuable power module of the first embodiment of the disclosure.

Please refer to FIG. 1, FIG. 2 and FIG. 4, in which the battery 20 includes a main body 21, a first electrode terminal 221, a second electrode terminal 231, and a conducting terminal 232. In this embodiment, the main body 21 is approximately formed as a round cylinder, but embodiments of the disclosure are not limited thereto; the structure of the main body 21 can also be a cuboid, a triangular cylinder and so forth for correspondingly receiving in the battery receiving groove. That is, the outer diameter of the battery 20 is approximately equal to the inner diameter of the battery receiving groove. Additionally, although the heights of the batteries 20 shown in the features are the same, but embodiments of the disclosure are not limited thereto; that is, the heights of the batteries 20 can be different for correspondingly receiving the battery cores 201 with different voltages, or can be the same for receiving the battery cores 201 with different voltages. Here, the battery core 201 can be the battery core of a dry cell, an alkaline cell or a lithium cell, but embodiments of the disclosure are not limited thereto; for instance, the battery core 201 can also be the battery core of a rechargeable cell. Here, the number of the battery cores 201 is not limited in the main body 21 of each battery 20. Additionally, in some embodiments, the battery core 201 is connected electrically to the aforementioned terminals via conducting wires or circuit boards with the aiding of welding, packaging and connecting means so forth, instead of directly connected electrically to the aforementioned terminals.

The main body 21 has a connecting end 22 and a continuing end 23 respectively defined at two ends thereof. The first electrode terminal 221 is disposed at the connecting end 22, and the second electrode terminal 231 is disposed at the continuing end 23. The structure of the second electrode terminal 231 matches with the structure of the first electrode terminal 221, such that the first electrode terminal 221 of the battery 20b is connected electrically to the second electrode terminal 231 of the battery 20a. The first electrode terminal 221 and the second electrode terminal 231 are respectively connected electrically to the battery core 201; that is, one end of the first electrode terminal 221 of the battery 20b which is exposed out of the main body 21 can be connected to one end of the second electrode terminal 231 of the battery 20a which is exposed out of the main body 21, while the other end of the first electrode terminal 221 of the battery 20b and the other end of the second electrode terminal 231 of the battery 20a are respectively connected to the corresponding battery cores 201 of the battery 20a and the battery 20b. Here, the first electrode terminal 221 can be the positive terminal, and the second electrode terminal 231 can be the negative terminal, but embodiments of the disclosure are not limited thereto; that is, the electric potential of the first electrode terminal 221 is different from that of the second electrode terminal 231. As shown in FIG. 4, the first electrode terminal 221 is connected electrically to the positive terminal of the battery core 201, and the second electrode terminal 231 is connected to the negative terminal of the battery core 201. For convenience, hereinafter, the first electrode terminal 221 is defined as the positive terminal and the second electrode terminal 231 is defined as the negative terminal.

The conducting terminal 232 includes a secured end 2321 and a free end 2322; namely, two ends of the conducting terminal 232 are respectively the secured end 2321 and the free end 2322. The secured end 2321 is disposed at the continuing end 23, while the free end 2322 is detachably connected to the first electrode terminal 221. For each battery 20a, 20b, the conducting terminal 232 is connected electrically to the first electrode terminal 221 via the free end 2322, such that the continuing end 23 of one battery 20a is connected to the connecting end 22 of another battery 20b to form a series connection for increasing the outputted voltage. In this embodiment, the first electrode terminal 221, the second electrode terminal 231, and the conducting terminal 232 are secured in the main body 21 via plastic injection molding techniques; that is, when the aforementioned terminals are manufactured and the corresponding relationships therebetween are built, the main body 21 of the battery 20 can be produced by plastic injection molding with the aforementioned terminals being embedded in the main body 21; but embodiments of the disclosure are not limited thereto, those who are skilled in the art might apply other techniques to dispose the aforementioned terminal in the main body 21. Additionally, being embedded in the main body 21, the aforementioned terminals can also be disposed in the space defined in the main body 21, as shown in FIG. 3D.

Figure 3A:
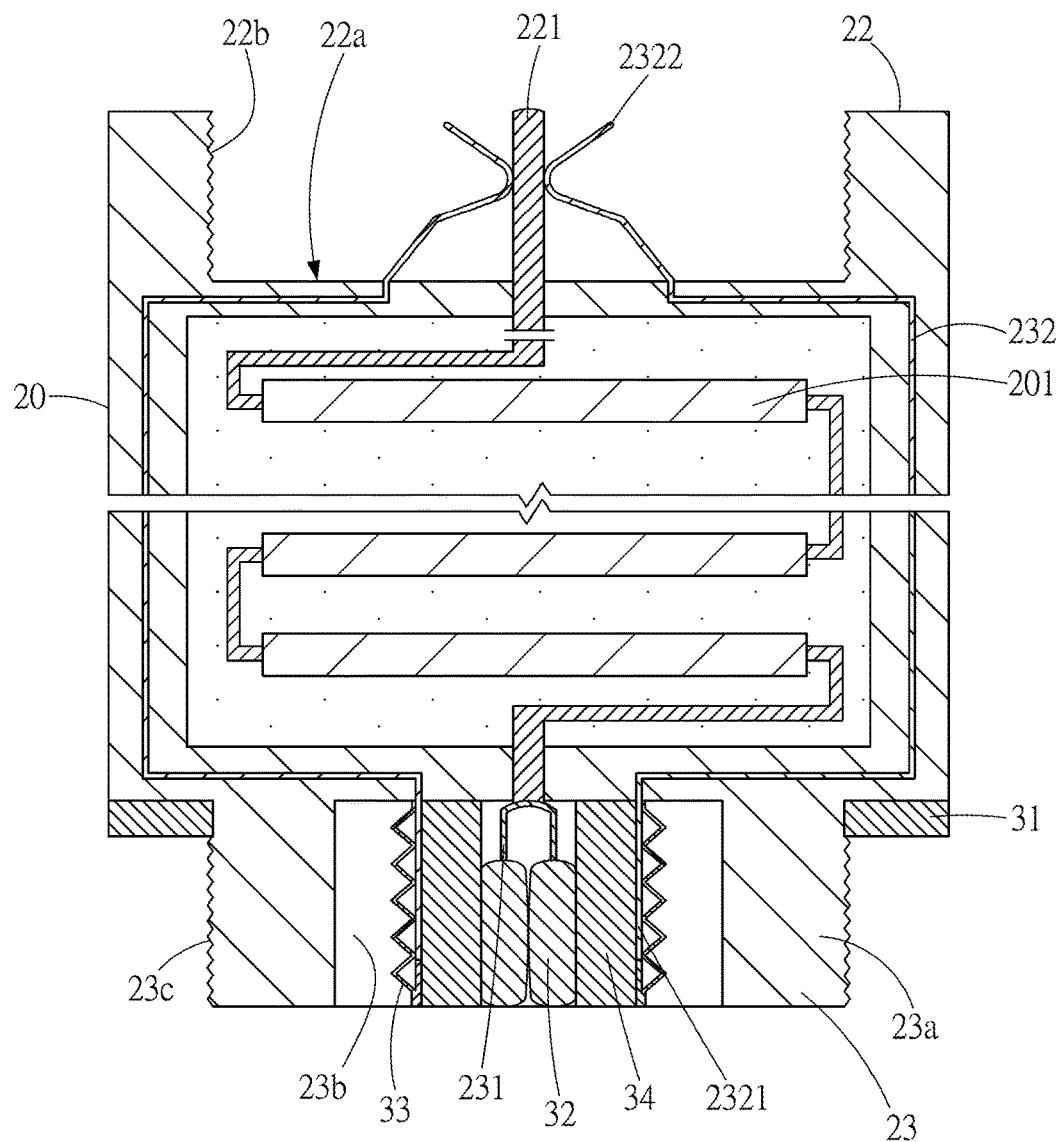
FIG. 3A is a partial cross-sectional view (1) of the continuable power module of the first embodiment of the disclosure.

Please refer to FIG. 3A, in which in one implementation aspect, the connecting end 22 includes a positioning portion 22a, and a positioning structure 22b. The positioning portion 22a is recessed at a center of the connecting end 22 for receiving the first electrode terminal 221 and the free end 2322 of the conducting terminal 232, while the positioning structure 22b is annularly disposed at an inner wall of the positioning portion 22a. Here, the positioning structure 22b is an internal threading structure, but embodiments of the disclosure are not limited thereto; in some cases, the positioning structure 22b can be an engaging groove or structures similar thereto.

The continuing end 23 includes a limiting portion 23a, a void 23b, and a limiting structure 23c. The limiting portion 23a is protruded from a center of the continuing end 23, and the structure thereof is matched with the structure of the positioning portion 22a of the connecting end 22. The void 23b is located at a center of the limiting portion 23a for receiving the second electrode terminal 231 and the secured end 2321 of the conducting terminal 232. The limiting structure 23c is annularly disposed at an outer wall of the limiting portion 23a for correspondingly matching with the positioning structure 22b of the connecting end 22. Here, the limiting structure 23c is an external threading structure so as to threading with the positioning structure 22b, but embodiments of the disclosure are not limited thereto; in some cases, the limiting structure 23c can be an engaging block or other structures so as to be detachably connected to the positioning structure 22b.

Via the matching between the positioning portion 22a and the limiting portion 23a and the matching between the positioning structure 22b and the limiting structure 23c, the continuing end 23 of the battery 20a is connected and fastened with the connecting end 22 of the battery 20b.

Figure 3B:
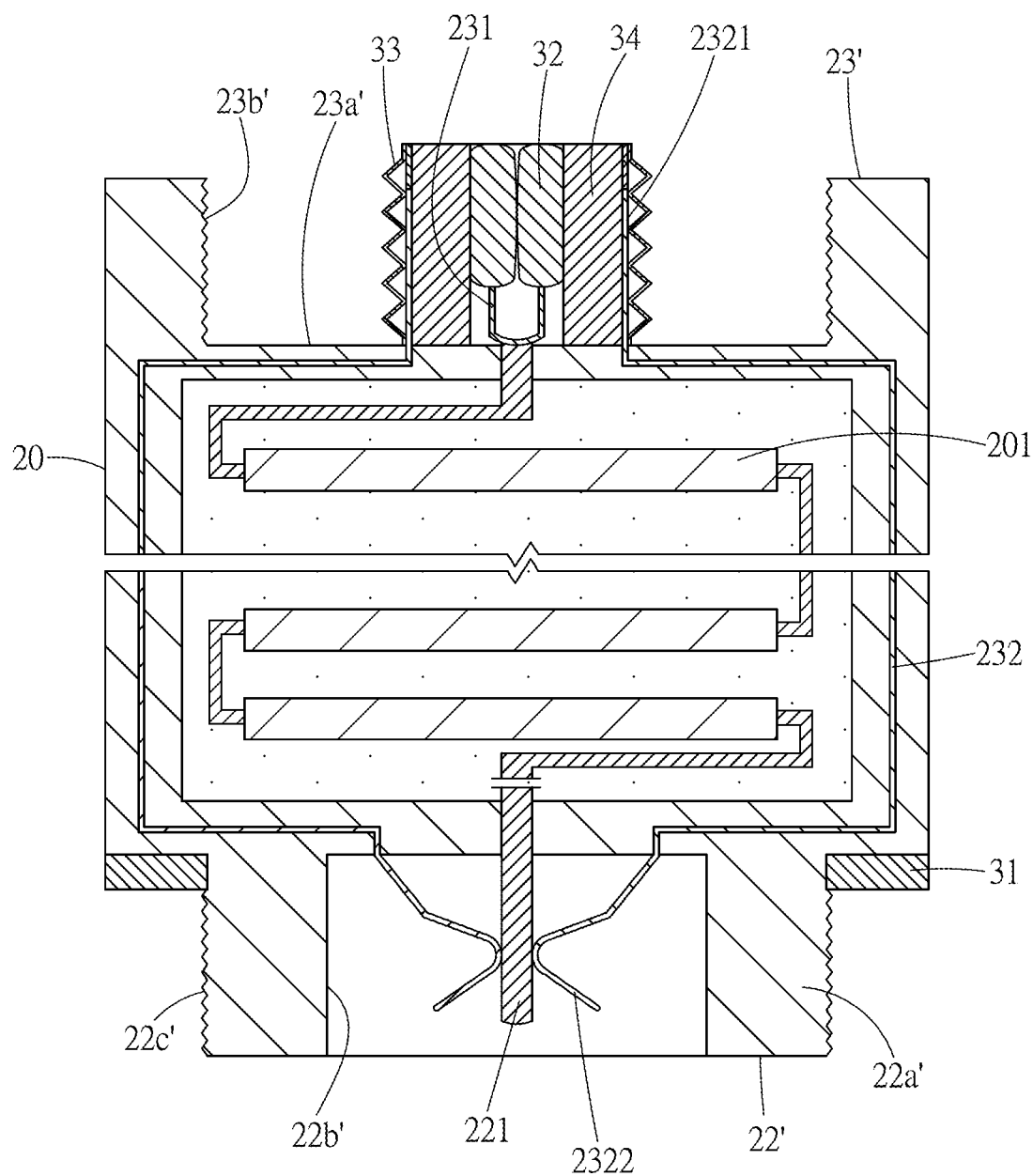
FIG. 3B is a partial cross-sectional view (2) of the continuable power module of the first embodiment of the disclosure.

Please refer to FIG. 3B, in which in one implementation aspect, the connecting end 22 includes a limiting portion 22a', a void 22b', and a limiting structure 22c'. The limiting portion 22a' is protruded from a center of the connecting end 22. The void 22b' is located at a center of the limiting portion 22a' for receiving the first electrode terminal 221 and the free end 2322 of the conducting terminal 232. The limiting structure 22c' is annularly disposed at an outer wall of the limiting portion 22a'. Here, the limiting structure 22c' is an external threading structure, but embodiments of the disclosure are not limited thereto; the limiting structure 22c' can also be an engaging block. The continuing end 23 includes a positioning portion 23a' and a positioning structure 23b'. The positioning portion 23a' is recessed at a center of the continuing end 23 for receiving the second electrode terminal 231 and the secured end 2321 of the conducting terminal 232 and correspondingly matches with the limiting portion 22a' of the connecting end 22. The positioning structure 23b' is annularly disposed at an inner wall of the positioning portion 23a' so as to correspondingly match with the limiting structure 22b' of the connecting end 22. Here, the positioning structure 23b' is an internal threading structure, but embodiments of the disclosure are not limited thereto; the positioning structure 23b' can also be an engaging groove so as to correspondingly match with the engaging block. Similarly, via the matching between the positioning portion 23a' and the limiting portion 22a' and the matching between the positioning structure 23b' and the limiting structure 22c', the continuing end 23 of the battery 20a is connected and fastened with the connecting end 22 of the battery 20b (not shown).

Please refer to FIG. 4 again, in which in this embodiment, the first electrode terminal 221 is a thin rod-like structure, and the second electrode terminal 231 is a circular groove structure which has a receiving space (that is the space defined in the second electrode terminal 231) for correspondingly receiving the first electrode terminal 221. The secured end 2321 of the conducting terminal 232 is a ring structure disposed around the outer periphery of the second electrode terminal 231. In other words, the second electrode terminal 231 and the secured end 2321 of the conducting terminal 232 are disposed concentrically. The conducting terminal 232 is made of conductive material, such as metal, conductive rubber, conductive polymer, etc. The free end 2322 of the conducting terminal 232 is a flexible stripe structure, so that the free end 2322 of the conducting terminal 232 is movably leant against the first electrode terminal 221. Here, the number of the conducting terminal 232 is two, and the two free ends 2322 of the two conducting terminals 232 are respectively leant against the two sides of the first electrode terminal 221; but, it is understood that the number of the conducting terminal 232 is not limited thereto.

Please refer to FIG. 3A, in which when the battery 20a is not connected to another battery 20b, the free end 2322 of the conducting terminal 232 is leant against the first electrode terminal 221, such that the conducting terminal 232 is connected electrically to the first electrode terminal 221 via the free end 2322. Therefore, the positive terminal and the negative terminal of the battery 20a are respectively defined at the secured end 2321 of the conducting terminal 232 and the second electrode terminal 231. Please refer to FIG. 4, in which when the continuing end 23 of the battery 20a is connected to the connecting end 22 of the battery 20b, the free end 2322 of the conducting terminal 232 of the battery 20b is detached from the first electrode terminal 221 and leant against an outer periphery of the secured end 2321 of the conducting terminal 232 of the battery 20a, such that the second electrode terminal 231 of the battery 20a is connected electrically to the first electrode terminal 221 of the battery 20b. Under this arrangement, the positive terminal and the negative terminal are respectively at the secured end 2321 of the conducting terminal 232 and the second electrode terminal 231 of the battery 20b. Similarly, when the battery 20a is detached from the battery 20b, the free end 2322 of the conducting terminal 232 of the battery 20b is again leant against the first electrode terminal 231 thereof, such that the conducting terminal 232 thereof is connected electrically to the first electrode terminal 231 via the free end 2322.

Based on the above, when the batteries 20a is connected to the battery 20b via a series connection, the continuing end 23 of the battery 20a is connected to the connecting end 22 of the battery 20b; meanwhile, the second electrode terminal 231 of the battery 20a is correspondingly connected to the first electrode terminal 221 of the battery 20b. Under this arrangement, a number of batteries 20 are connected electrically to each other via a series connection, so that the voltages of the continuable power module 100 are increased.

Figure 5A:
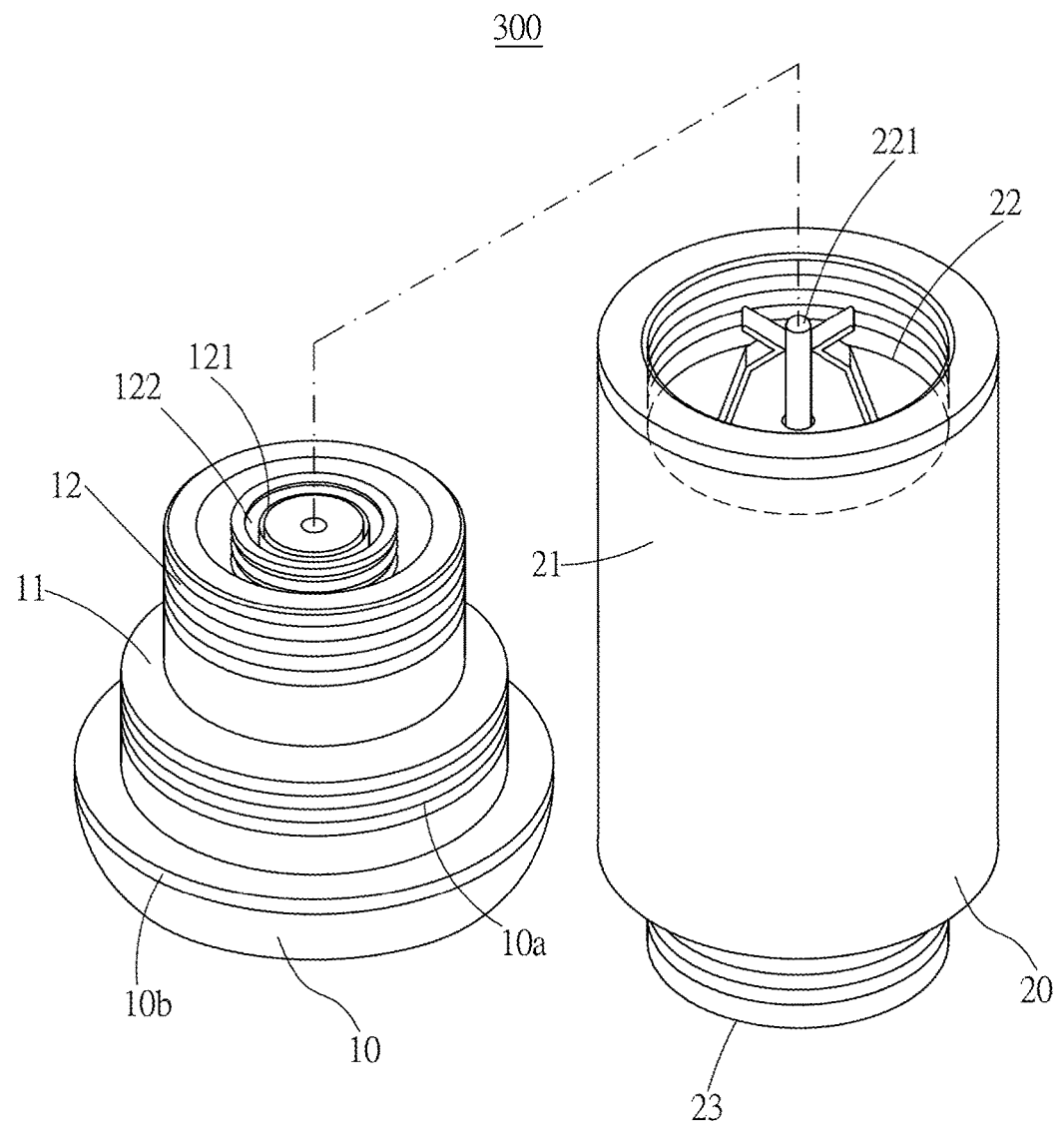
FIG. 5A is a perspective view (1) of a continuable power module of a second embodiment of the disclosure.
Figure 5B:
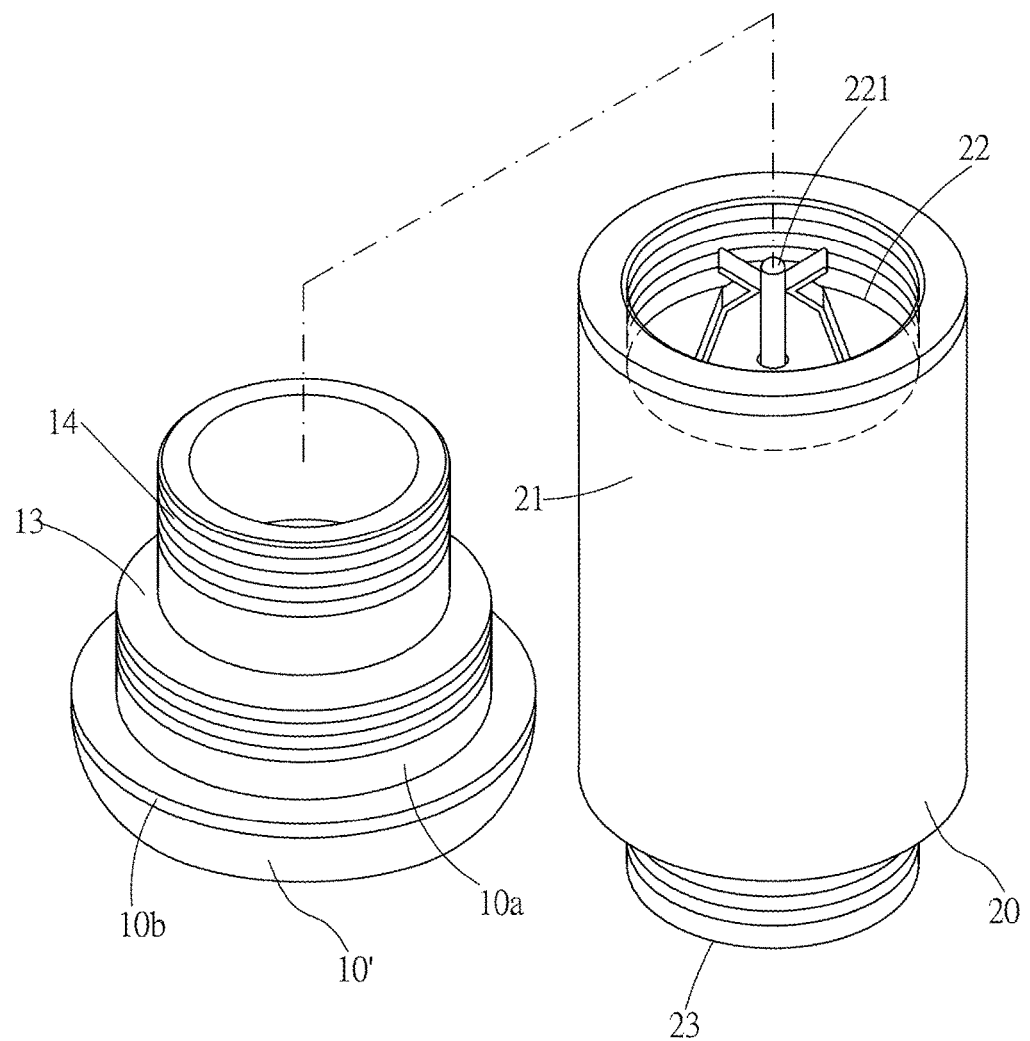
FIG. 5B is a perspective view (2) of the continuable power module of the second embodiment of the disclosure.
Figure 6:
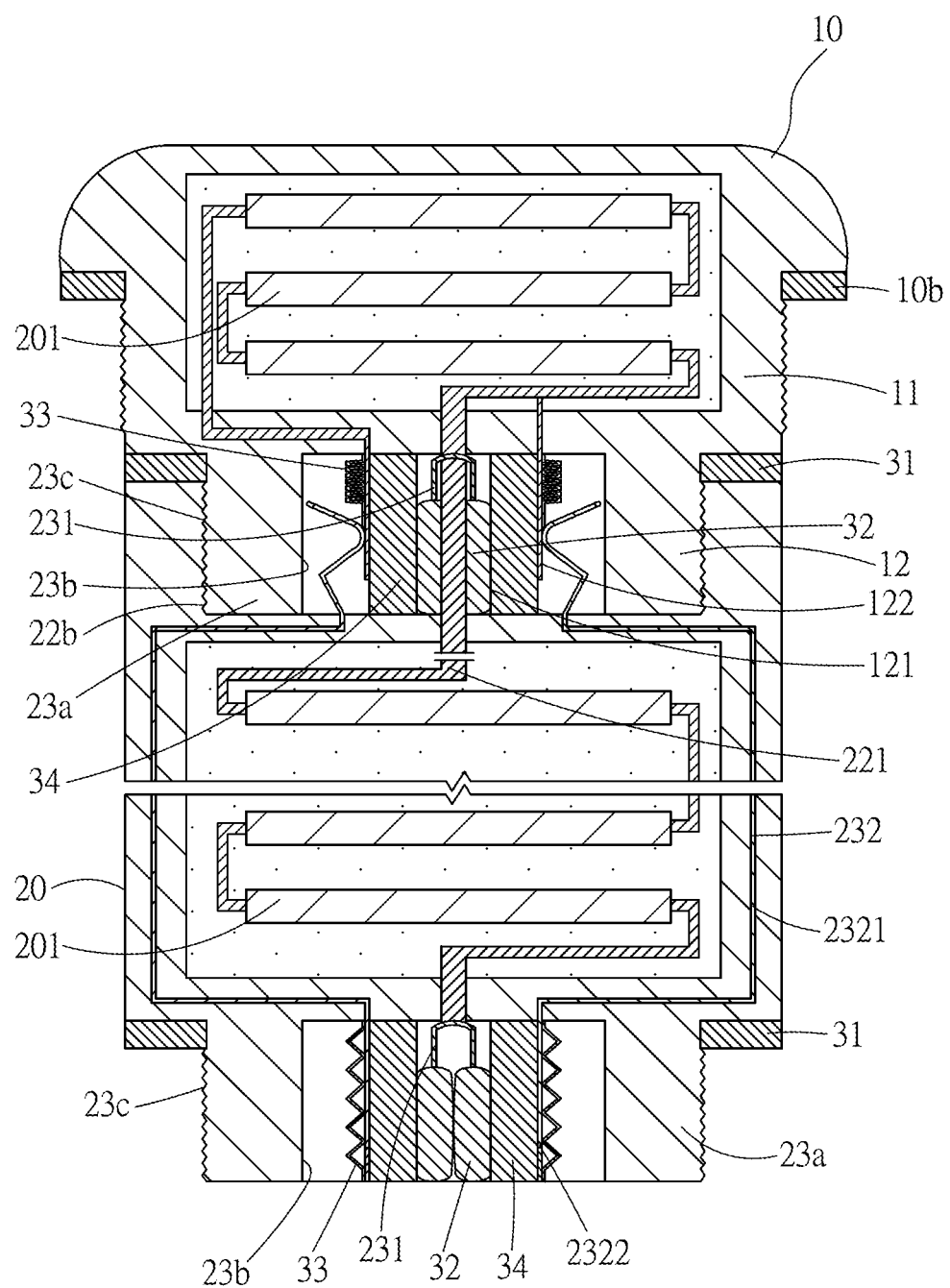
FIG. 6 is a cross-sectional view of the continuable power module of the second embodiment of the disclosure.

Please refer to FIG. 5A, FIG. 5B and FIG. 6, which are perspective views and a cross-sectional view of a continuable power module 300 of the second embodiment of the disclosure. The second embodiment is generally similar to the first embodiment, except that the continuable power module 300 of the second embodiment further has a base member 10 connectable with the battery 20. In this embodiment, the structure of the base member 10 matches with the structure of the battery 20 so as to be round cylindered, but embodiments of the disclosure are not limited thereto; the structure of the base member 10 can also be a cuboid, a triangular cylinder and so forth for correspondingly receiving in the battery receiving groove; that is, the outer diameter of the base member 10 is approximately equal to the inner diameter of the battery receiving groove.

In one implementation aspect, the base member 10 includes a base body 11, a linking end 12, a first contacting terminal 121, and a second contacting terminal 122. The linking end 12 is disposed at one side of the base body 11. The first contacting terminal 121 is disposed at the linking end 12, and the structure of the first contacting terminal 121 is substantially the same as that of the second electrode terminal 231 and matches with the structure of the first electrode terminal 221 of the battery 20, such that the first contacting terminal 121 of the base member 10 is connected electrically to the first electrode terminal 221 of the battery 20. The second contacting terminal 122 is disposed at the linking end 12 of the base body 10 and connected electrically to the first contacting terminal 121. Here, the structure of the linking end 12 is substantially the same as the structure of the continuing end 23 of the battery 20; in other words, the structure of the linking end 12 of the base member 10 is corresponding to the structure of the connecting end 22 of the battery 20. Similarly, the structures of the first contacting terminal 121 and the second contacting terminal 122 are generally similar to the structures of the second electrode terminal 231 and the secured end 2321 of the conducting terminal 232 respectively; certainly, when the linking end 12 of the base member 10 is connected electrically to the connecting end 22 of the battery 20, the first contacting terminal 121 and the second contacting terminal 122 of the linking end 12 are respectively matched with the first electrode terminal 221 and the free end 2322 of the conducting terminal 232 of the battery 20, the detail connection mechanism between the battery 20 and the base member 10 is substantially similar to that between a number of batteries 20 so as to be omitted here.

Please refer to FIG. 5B, in which in one implementation aspect, the base member 10' includes a base body 13 and a receiving end 14. The receiving end 14 is disposed at one side of the base body 13, and the structure thereof matches with the connecting end 22 of the battery 20 so as to receive the first electrode terminal 221 and the free end 2322 of the conducting terminal 232 of the battery 20. Here, the receiving end 14 has a containing groove (that is, the space defined inside the receiving end 14), to receive the first electrode terminal 221 and the free end 2322 of the conducting terminal 232. Under this arrangement, when the battery 20 is connected to the base member 10, the positioning portion 22a of the battery 20 is enclosed by the base member 10, such that the free end 2322 of the conducting terminal 232 received in the positioning portion 22a is not detached from the first electrode terminal 221 via the outside affections, the electrical connection between the first electrode terminal 221 and the free end 2322 of the conducting terminal 232 being maintained within the receiving end 14.

Please refer to FIG. 5A again, in which in one implementation aspect, the base member 10 has a fixing portion 10a disposed at a periphery of the base body 11, so that the base member 10 can be fastened with the battery receiving groove of the electric appliance. In this embodiment, the fixing portion 10a is a locking-connecting structure which has threaded patterns so as to be fastened with the battery receiving groove, but embodiments of the disclosure are not limited thereto. In one embodiment, the base member 10 is formed as a cone structure, and the diameter is gradually decreased from the bottom thereof toward the linking end thereof with an elastic rubber ring fitted thereover (not shown), so that the base member 10 is capable of closely attaching with the battery receiving groove via the elasticity of the elastic rubber ring; additionally, the elastic rubber ring also provides a function of waterproofing which avoids liquids or dusts from entering into the battery receiving groove and influencing the operation of the electric appliance.

In one implementation aspect, a first waterproof member 10b made of elastic material is adjacently disposed to the fixing portion 10a of the base member 10 and around the periphery of the base member 10 so as to be capable of proving a function of waterproofing; for example, the first waterproof member 10b can be a rubber washer, but embodiments of the disclosure are not limited thereto.

Please refer to FIG. 5A again, in which commonly, the diameter (the cross-sectional area), of one end of the base body 11 which is opposite to the linking end 12 thereof is larger than that of the linking end 12, such that when the fixing portion 10a has correspondingly been fastened with the battery receiving groove of the electric appliance, parts of the base member 10 are still exposed out of the battery receiving groove and the battery 20 can be exchanged conveniently. In this embodiment, the base member 10 is an adapting member and does not have the function of providing electricity (namely, the base member 10 does not have the battery core 201), but embodiments of the disclosure are not limited thereto; in some embodiments, the base member 10 has the battery core 201 disposed therein (as shown in FIG. 6), and the battery core 201 is connected electrically to the first contacting terminal 121 and the second contacting terminal 122 and capable of providing electricity as the battery 20 does.

Furthermore, please refer to FIG. 2, FIG. 3A, FIG. 4 and FIG. 6, in which in order to be capable of waterproofing, following features are introduced into the disclosure.

Please refer to FIG. 4 and FIG. 6, in which a second waterproof member 31 is disposed between the battery 20 and the base member 10 and between the battery 20a and the battery 20b. In one implementation aspect, the second waterproof member 31 is fitted over and fastened on the linking end 12 of the base member 10 and the continuing end 23 of the battery 20a; while in another implementation aspect, the second waterproof member 31 is disposed at the connecting end 22 of the battery 20b (not shown). Based on this, when the battery 20a is connected to the battery 20b or the base member 10, moist will not enter into the spaces between the batteries 20a, 20b or between the battery 20a and the base member 10 from the gaps therebetween, such that the leak of electricity is prevented. Here, the second waterproof member 31 is a waterproof washer, and preferably made of rubber, but embodiments of the disclosure are not limited thereto.

Please refer to FIG. 2, FIG. 3A and FIG. 4, in which the second electrode terminal 231 further has at least one waterproof elastomer 32 assembled in the receiving space thereof. In detail, the waterproof elastomer 32 is fastened in the receiving space of the second electrode terminal 231 and is made of soft material with flexible character, such as foam, silica gel or latex, but embodiments of the disclosure are not limited thereto. Please refer to FIG. 3E and FIG. 3F, in which the waterproof elastomer 32 is substantially a hollow cylinder structure made of elastic materials with fluids (liquids or gases), being filled therein. The waterproof elastomer 32 includes an elastomer body 321, and a channel 322 is opened at a center thereof. The channel 322 has a plurality of protruding portions 323 defined annularly around an inner wall thereof and radially protruded inward along the cross-sectional plane of the middle segment of the waterproof elastomer 32 to block moist from moving from one end of the channel 322 toward the other end of the channel 322, such that the waterproof elastomer 32 is watertight. Please refer to FIG. 3F again, in which when the first electrode terminal 221 of the battery 20a is connected electrically to the second electrode terminal 231 of the battery 20b, the first electrode terminal 221 is passing through the elastomer body 32 via the channel 322 and connected electrically to the second electrode terminal 231; at the same time, the protruding portions 323 of the elastomer body 321 is pressed outwardly toward a direction perpendicular to the inserting direction of the first electrode terminal 221 by the first electrode terminal 221, so that the elastomer body 321 is closely attached with the receiving space of the second electrode terminal 231 and the moist cannot enter into the receiving space from the gap between the elastomer body 321 and the receiving space. Additionally, as shown in FIG. 3F, due to the pressure caused by the first electrode terminal 221 and the circumstances, the middle part of one end of the elastomer body 321 which is exposed outside (that is, one end far from the battery core 201), is recessed inward, and the outer periphery thereof is not compressed because of the increasing of the pressure inside the elastomer body 321. Furthermore, as shown in FIG. 3E and FIG. 3F, the second electrode terminal 231 has a terminal inserting portion 2311 and an abutting wall 2312. The terminal inserting portion 2311 is recessed at the center part of the receiving space of the second electrode terminal 231 and provided for electrically connecting with the first electrode terminal 221; while the abutting wall 2312 is substantially the bottom of the receiving space which is capable of blocking and abutting the elastomer body 321 from pressing the terminal inserting portion 2311. That is, in FIG. 3E and FIG. 3F, the terminal inserting portion 2311 is recessed at the center part of the receiving space of the second electrode terminal 231, but embodiments of the disclosure are not limited thereto, the terminal inserting portion 2311 can be disposed at the bottom of the receiving space or closely attaching with the inner wall of the receiving space. It is understood that, as shown in FIG. 3E and FIG. 3F, when the first electrode terminal 221 is connected electrically to the second electrode terminal 231, the first electrode terminal 221 is attached with the bottom and the inner wall of the terminal inserting portion 2311 of the second electrode terminal 231, but embodiments of the disclosure are not limited thereto, the first electrode terminal 221 also can be only attached with the bottom or the inner wall of the terminal inserting portion 2311.

As shown in FIG. 3A, when the battery 20a is not connected to the battery 20b, the second electrode terminal 231 of the battery 20a is substantially protected by the waterproof elastomer 32 so that moist cannot enter into the receiving space of the second electrode terminal 231. As shown in FIG. 4, when the first electrode terminal 221 of the battery 20b is connected to the second electrode terminal 231 of the battery 20a, the waterproof elastomer 32 is extruded and the channel 322 thereof is opened by the first electrode terminal 221, such that the first electrode terminal 221 is smoothly inserted into the bottom of the receiving space of the second electrode terminal 231 (that is, the first electrode terminal 221 is attached with the terminal inserting portion 2311 of the second electrode terminal 231), and the electrical connection between the battery 20a and the battery 20b is achieved. Similarly, when the first electrode terminal 221 is pulled out from the second electrode terminal 231, the waterproof elastomer 32 in the receiving space of the second electrode terminal 231 is resiliently moved back to an original position thereof due to the elasticity.

Please refer to FIG. 2, FIG. 3A and FIG. 4, in which the secured end 2321 of the conducting terminal 232 of the continuing end 23 has a flexible folding member 33 fitted thereover in which the structure thereof is substantially similar to a blast pipe or a shock absorber and capable of being folded and telescoped. As shown in FIG. 3A, when the battery 20a is not connected to the battery 20b, the secured end 2321 of the conducting terminal 232 is enclosed by the flexible folding member 33, thereby preventing the moist from contacting the secured end 2321 of the conducting terminal 232. Additionally, as shown in FIG. 4, when the continuing end 23 of the battery 20a is connected to the connecting end 22 of the battery 20b, the flexible folding member 33 of the battery 20a is compressed inward along the length direction of the secured end 2321 of the conducting terminal 232 of the battery 20a along with the pushing of the free end 2322 of the conducting terminal 232 of the battery 20b and the secured end 2321 of the conducting terminal 232 of the battery 20a is exposed out from the flexible folding member 33, so that the free end 2322 of the conducting terminal 232 of the battery 20b is leant against and connected electrically to the secured end 2321 of the conducting terminal 232 of the battery 20a. Similarly, when the continuing end 23 of the battery 20a is detached from the connecting end 22 of the battery 20b, the flexible folding member 33 of the battery 20a is moved resiliently to the original position thereof, due to the elasticity.

Briefly, when the battery 20a is not connected to the battery 20b, the waterproof elastomer 32 blocks the moist from entering into the second electrode terminal 231 and prevents from events of leaking electricity; while the flexible folding member 33 has the function of separating the secured end 2321 of the conducting terminal 232 from the circumstance, such that the moist cannot contact the secured end 2321 of the conducting terminal 232, thereby event of leaking electricity being prevented. When the battery 20a is connected to the battery 20b, the waterproof elastomer 32 of the battery 20a is extruded and the channel 322 thereof is opened by the first electrode terminal 221 of the battery 20b, such that the first electrode terminal 221 of the battery 20b is inserted into the second electrode terminal 231 of the battery 20a to achieve the electrical connection therebetween; simultaneously, the flexible folding member 33 of the battery 20a is compressed inward along the length direction of the secured end 2321 of the conducting terminal 232 of the battery 20a along with the pushing of the free end 2322 of the conducting terminal 232 of the battery 20b and the secured end 2321 of the conducting terminal 232 of the battery 20a is exposed out from the flexible folding member 33, so that the free end 2322 of the conducting terminal 232 of the battery 20b is connected electrically to the secured end 2321 of the conducting terminal 232 of the battery 20a. Under this arrangement, the battery 20a and the battery 20b are connected electrically to each other. Conversely, when the battery 20a is detached from the battery 20b, the waterproof elastomer 32 of the battery 20a is resiliently moved back to an original position thereof along with the departing of the first electrode terminal 221 of the battery 20b due to the elasticity; meanwhile, the flexible folding member 33 of the battery 20a is also resiliently moved back to the original position thereof along with the departing of the free end 2322 of the conducting terminal 232 of the battery 20b.

Figure 3C:
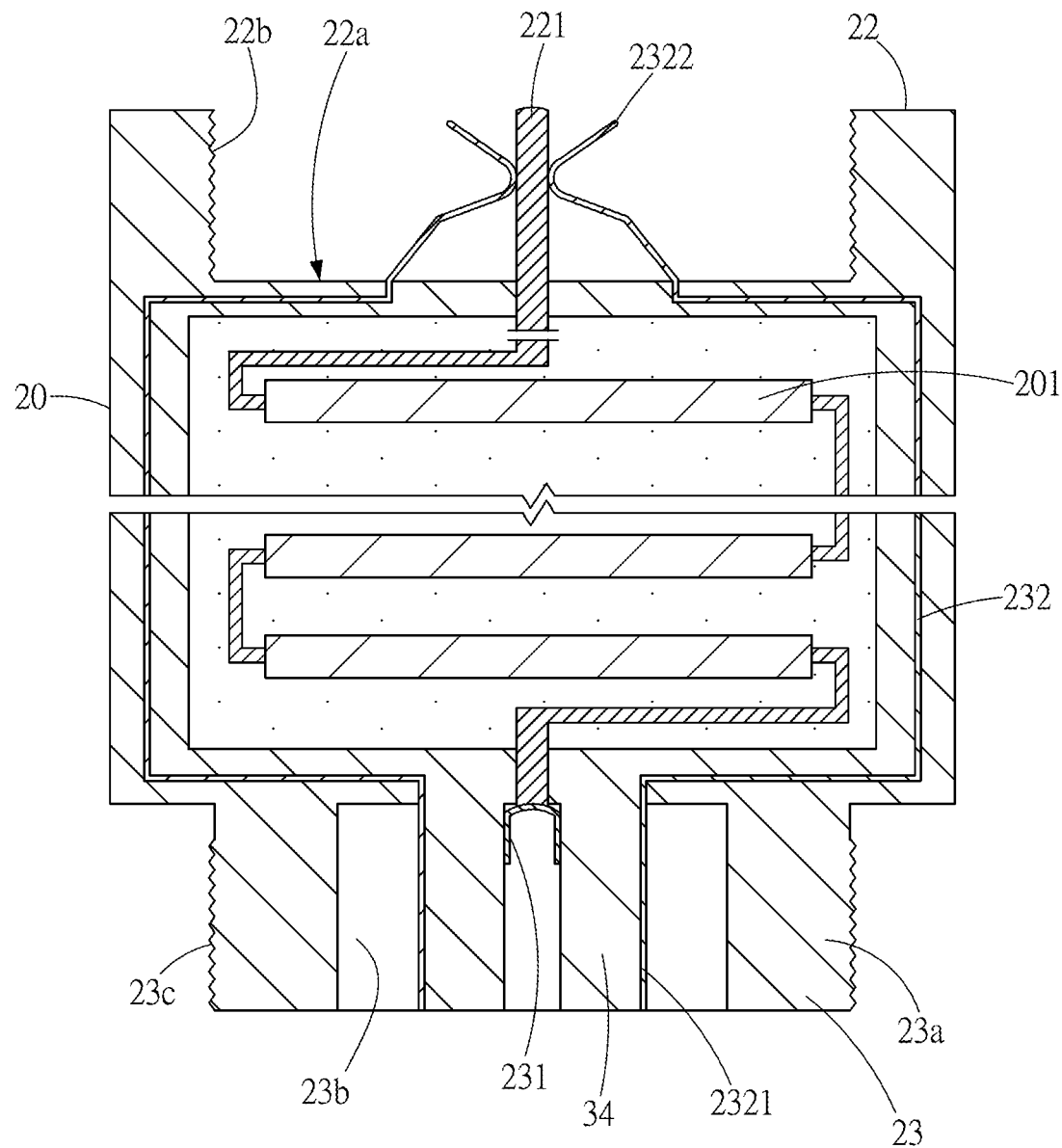
FIG. 3C is a partial cross-sectional view (3) of the continuable power module of the first embodiment of the disclosure.
Figure 3D:
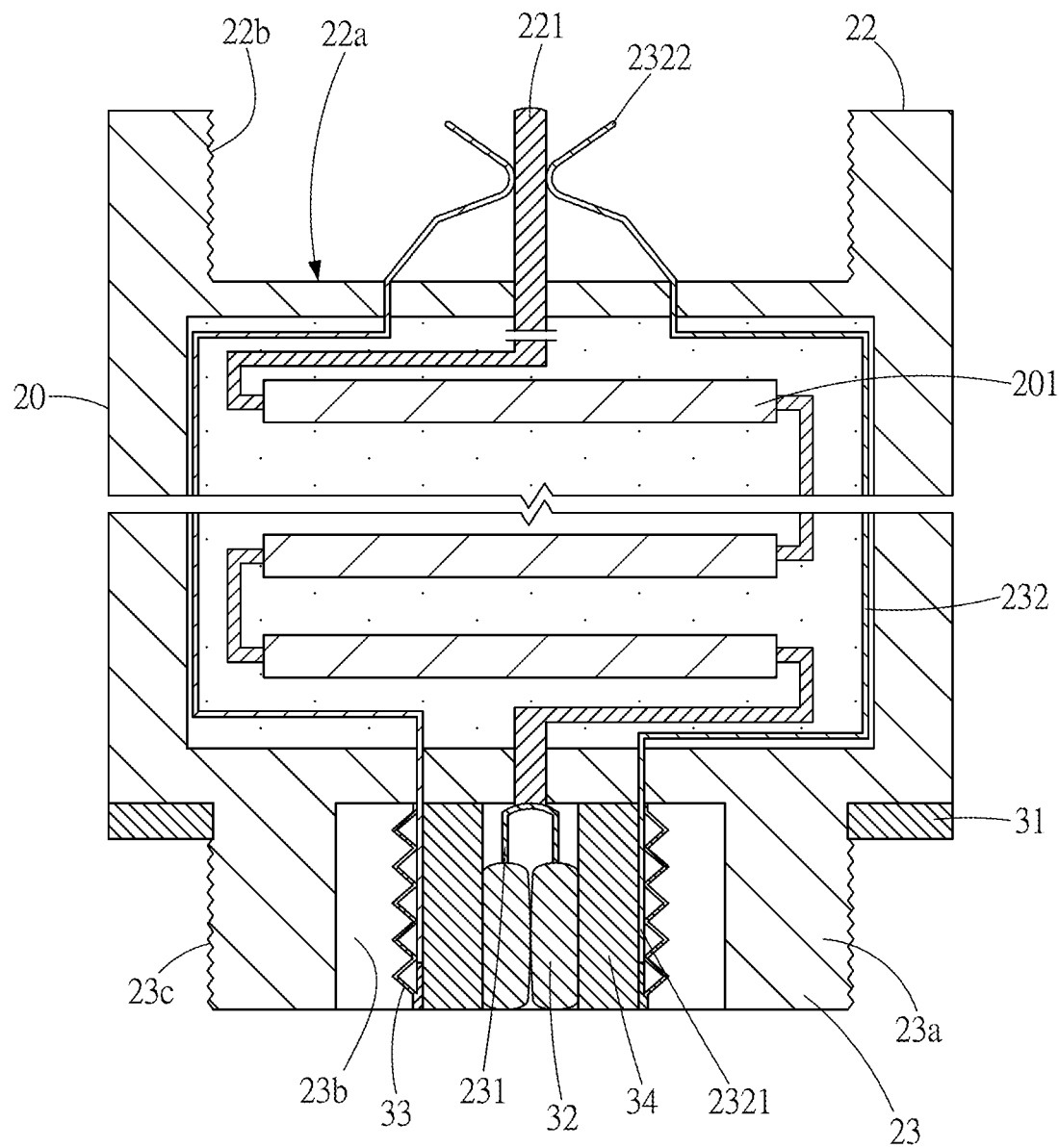
FIG. 3D is a partial cross-sectional view (4) of the continuable power module of the first embodiment of the disclosure.
Figure 3E:
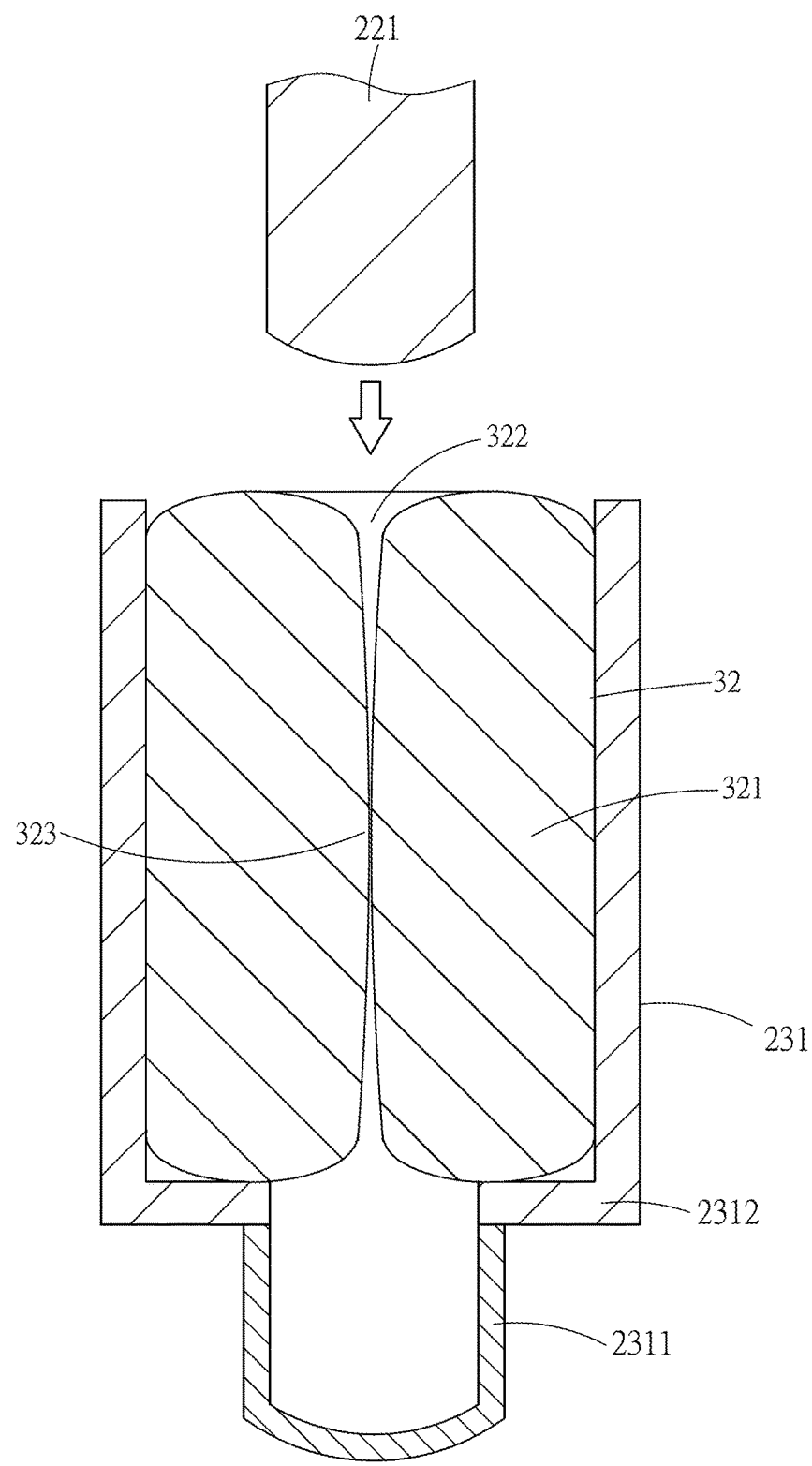
FIG. 3E is an operating schematic view (1) of a waterproof elastomer of the continuable power module of the first embodiment of the disclosure.
Figure 3F:
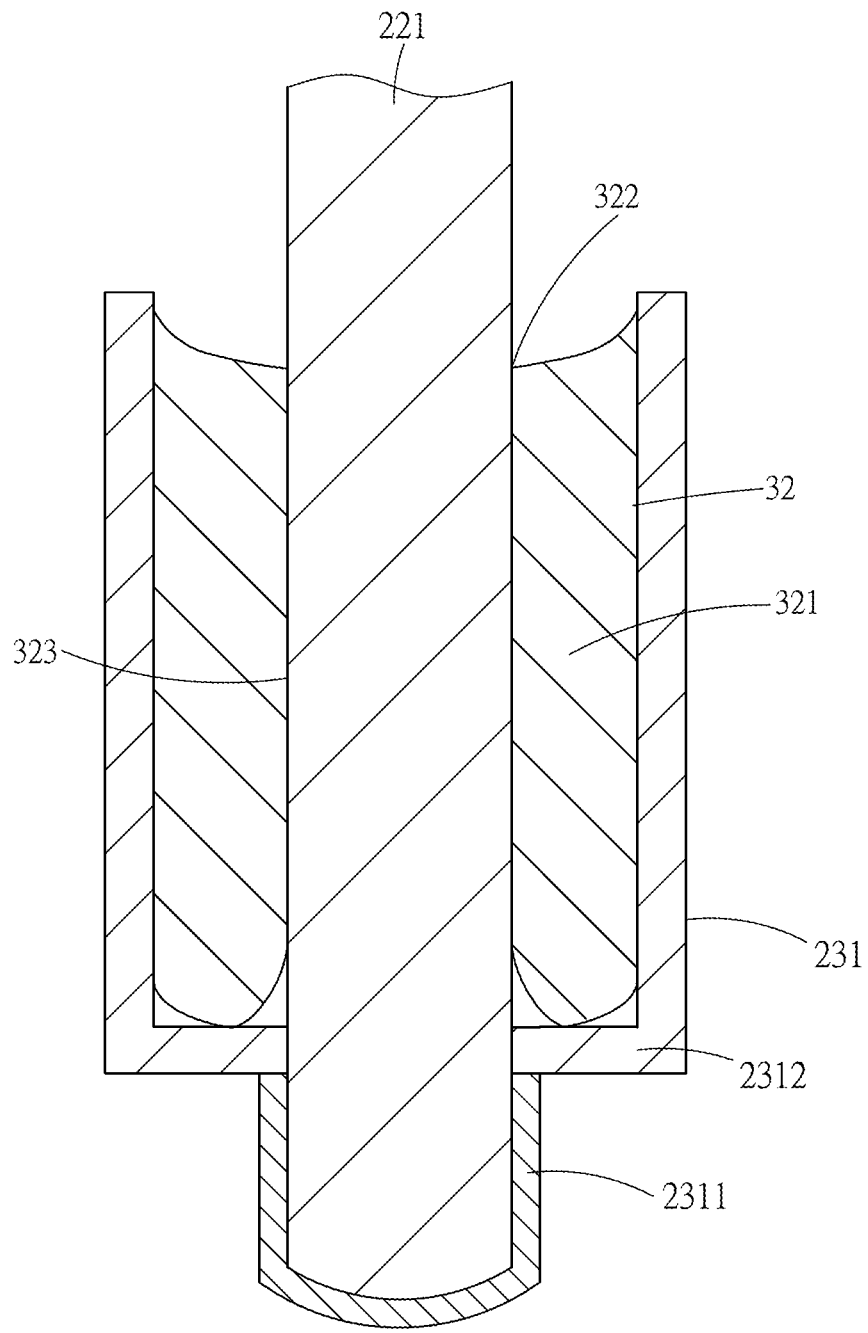
FIG. 3F is an operating schematic view (2) of the waterproof elastomer of the continuable power module of the first embodiment of the disclosure.

It is understood that the disclosure is not limited with the embodiments having the second waterproof member 31, the waterproof elastomer 32 and/or the flexible folding member 33; in some embodiments, the disclosure does not have the aforementioned waterproof members, as shown in FIG. 3C.

It is also understood that in order to prevent the second electrode terminal 231 from contacting the secured end 2321 of the conducting terminal 232 (in the case of the base member 10 capable of providing electricity, to prevent the first contacting terminal 121 from contacting the second contacting terminal 122), which would lead the short circuit, an insulating member 34 is disposed between the second electrode terminal 231 and the secured end 2321 of the conducting terminal 232 (or between the first contacting terminal 121 and the second contacting terminal 122), for separation. The insulating member 34 is made of rubber, but embodiments of the disclosure are not limited thereto; the insulating member 34 can also be made of hard plastic material which is disposed between the second electrode terminal 231 and the secured end 2321 of the conducting terminal 232 (or between the first contacting terminal 121 and the second contacting terminal 122). It is understood that, the insulating member 34 and the main body 21 also can be formed integrally as a whole, as shown in FIG. 3C.

Figure 7:
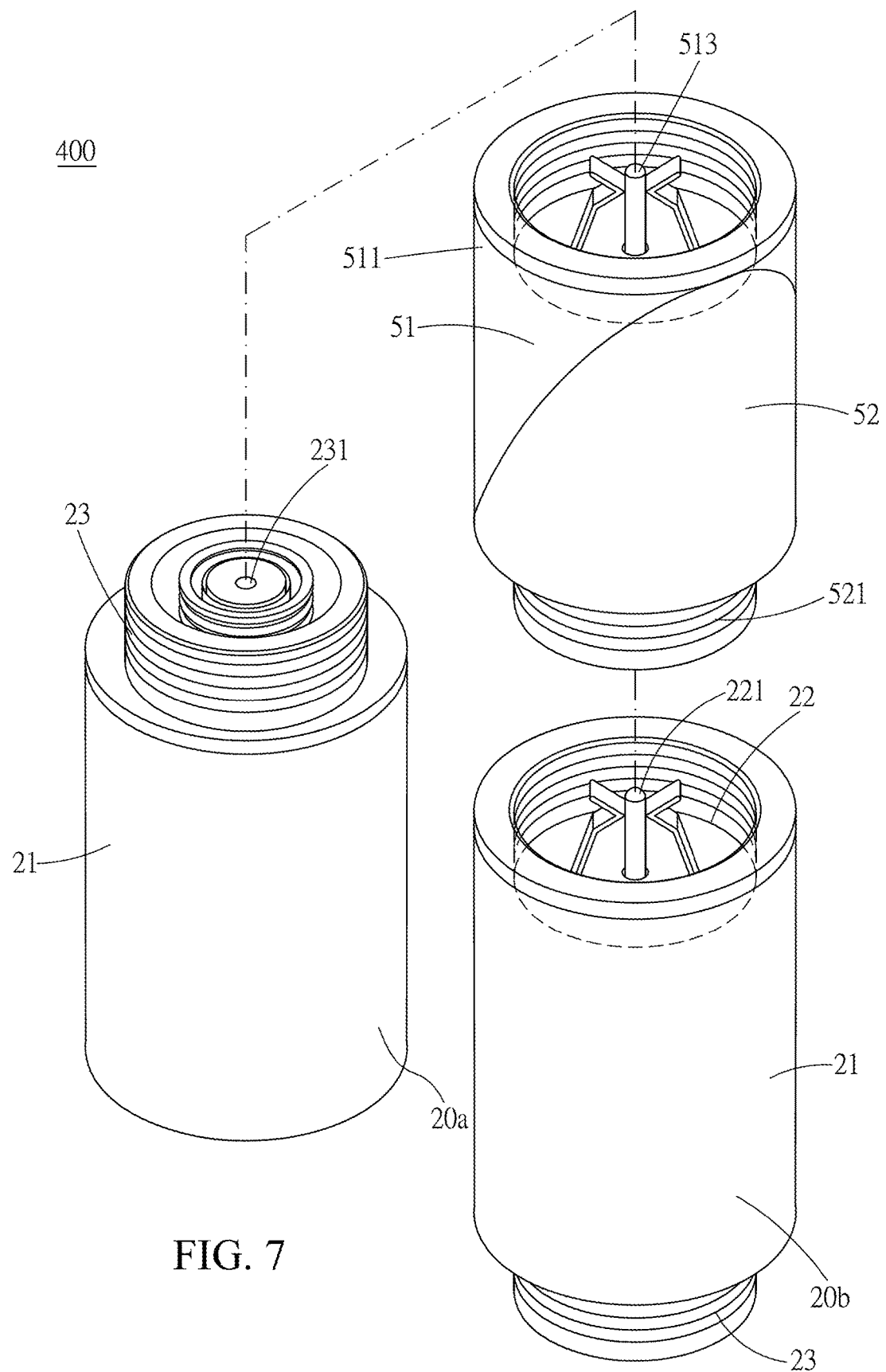
FIG. 7 is a perspective view of a continuable power module of a third embodiment of the disclosure.
Figure 8A:
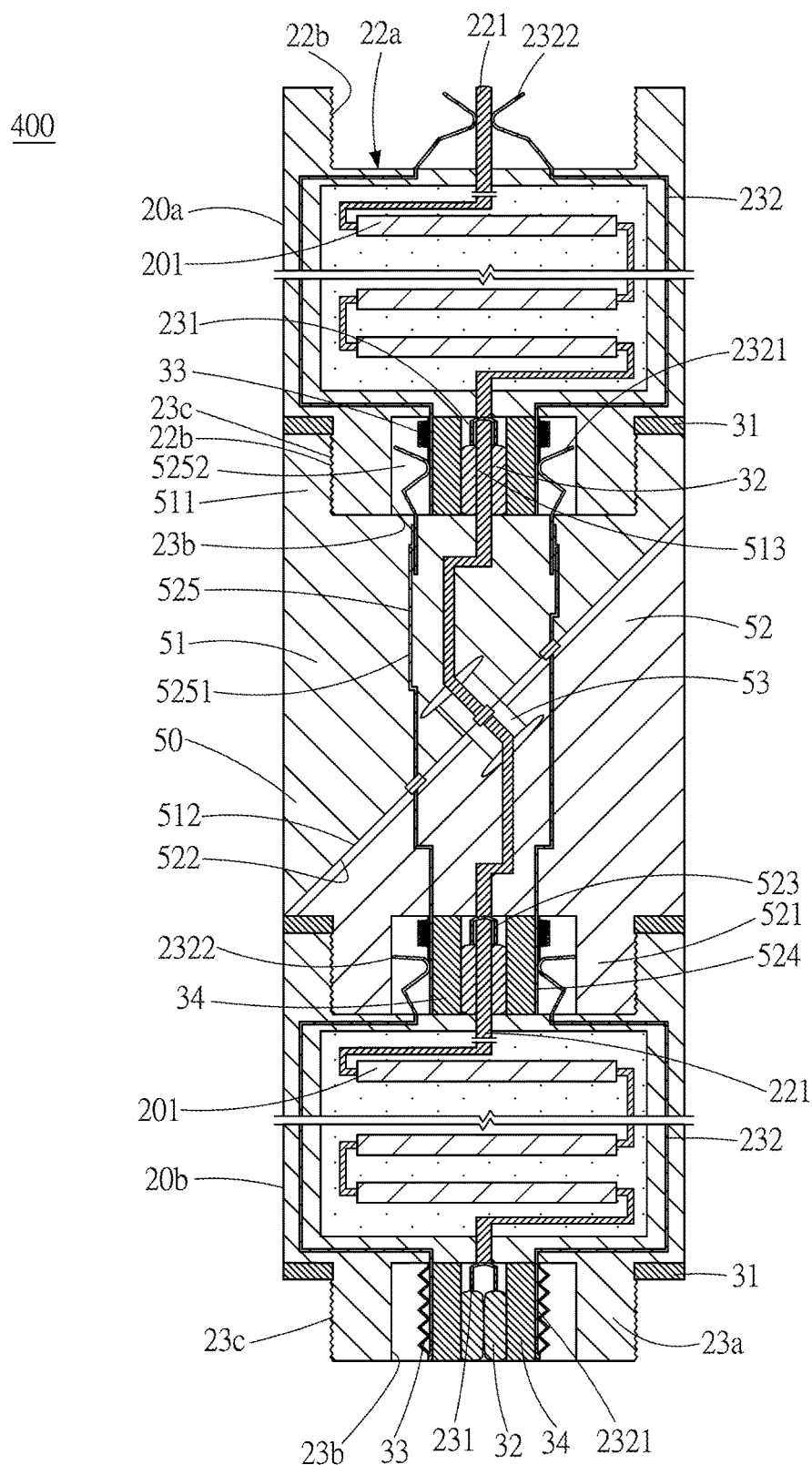
FIG. 8A is a cross-sectional view (1) of the continuable power module of the third embodiment of the disclosure.
Figure 8B:
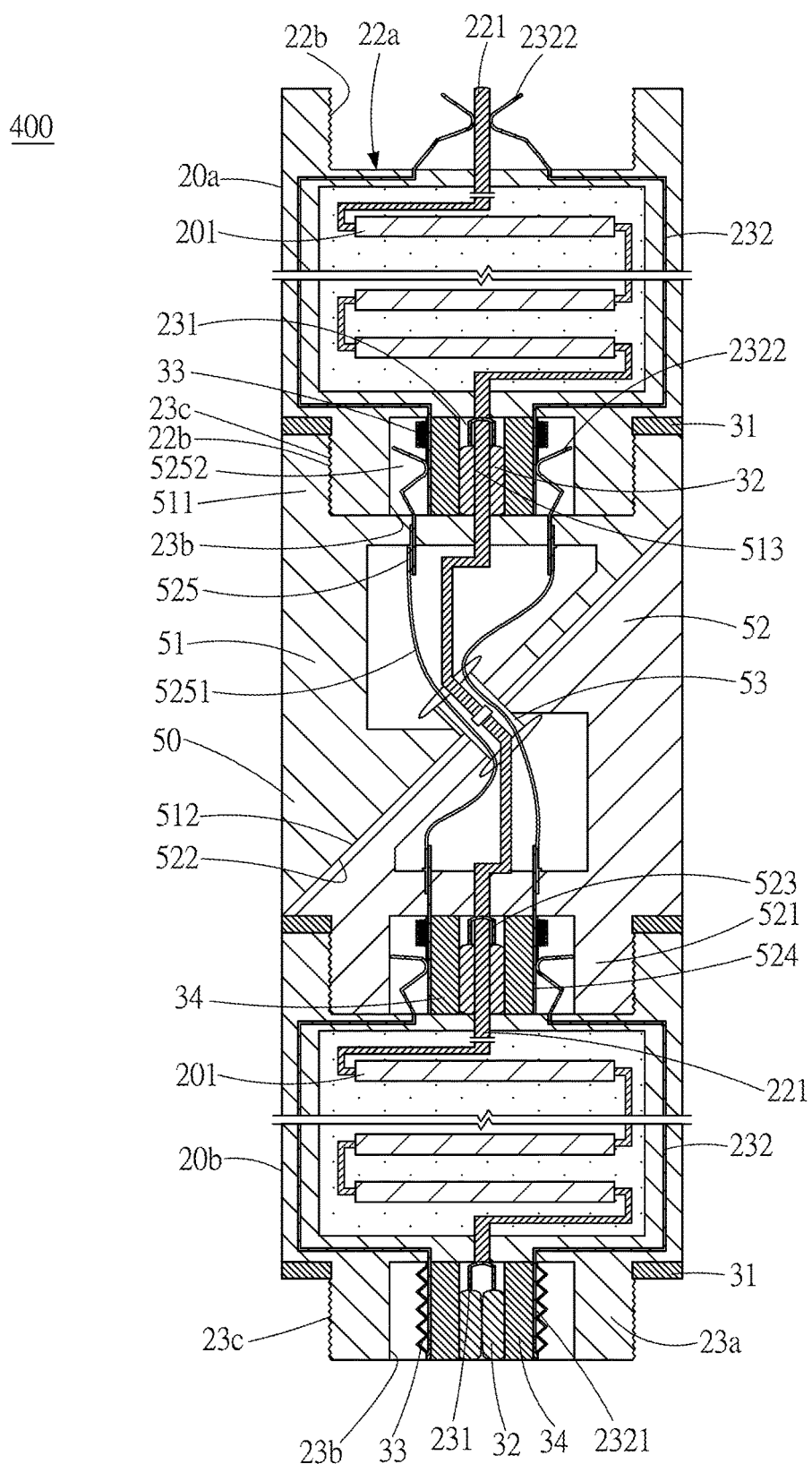
FIG. 8B is a cross-sectional view (2) of the continuable power module of the third embodiment of the disclosure.
Figure 9:
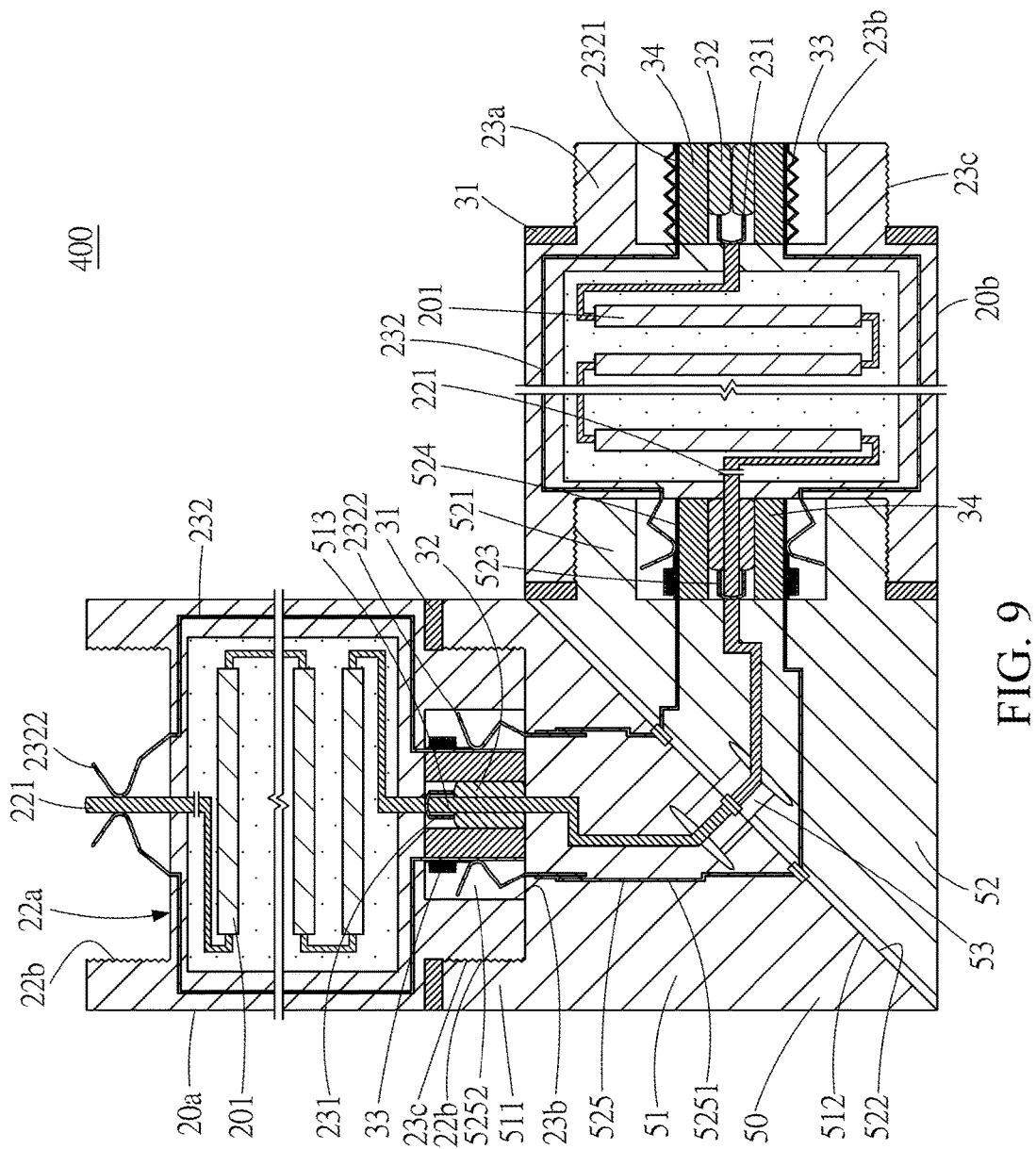
FIG. 9 is an operating schematic view (1) of the continuable power module of the third embodiment of the disclosure.

Please refer to FIGS. 7-10, which are a perspective view, cross-sectional views and operating schematic views of a continuable power module 400 of a third embodiment of the disclosure. The third embodiment is generally similar to the first embodiment or the second embodiment, except that the continuable power module 400 of the third embodiment further has a spindle body 50 disposed between the batteries 20a, 20b (as shown in FIG. 7), or between the battery 20 and the base member (not shown). Please refer to FIG. 8A, in which the spindle body 50 includes a first block body 21, a second block body 52 and a spindle member 53. The first block body 51 includes a first combing end 511, a first rotating end 512 and a first terminal 513. The structure of the first combining end 511 matches that of the continuing end 23 of the battery 20a, such that the first combining end 511 of the first block body 51 is capable of connecting to the continuing end 23 of the battery 20a. The first rotating end 512 is opposite to the first combining end 511 and axially defines an included angle with the spindle body 50. The first terminal 513 is disposed at the first combining end 511, and the structure thereof matches that of the second electrode terminal 231 of the continuing end 23, such that the first terminal 513 of the spindle body 50 is capable of electrically connecting with the second electrode terminal 231 of the battery 20a. The second block body 52 includes a second combining end 521, a second rotating end 522, a second terminal 523, a third terminal 524 and a connecting member 525. The structure of the second combining end 521 matches that of the connecting end 22 of the battery 20b, such that the second combining end 521 of the second block body 52 is capable of connecting to the connecting end 22 of the battery 20b. The second rotating end 522 is opposite to the second combining end 521 and the structure thereof matches with the first rotating end 512. The second terminal 523 is disposed at the second combining end 521 and connected electrically to the first terminal 513, and the structure of the second terminal 523 matches that of the first terminal 513; that is, the structure of the second terminal 523 is substantially the same as that of the second electrode terminal 231 so as to be connected electrically to the first electrode terminal 221. The third terminal 524 is disposed at the second combining end 521, and the structure thereof is substantially the same as that of the secured end 2321 of the conducting terminal 232, so that the free end 2322 of the conducting terminal 232 of the battery 20b can leant against the outer periphery of the third terminal 524. The connecting member 525 includes a fastened end 5251 and a movable end 5252. The fastened end 5251 is securely connected to the third terminal 524, and the movable end 5252 is detachably connected to the first terminal 513, such that the third terminal 524 is connected electrically to the first terminal 513 via the connecting member 525. In other words, the first terminal 513 and the movable end 5252 of the connecting member 525 respectively correspond to the second electrode terminal 231 and the secured end 2321 of the conducting terminal 232, and the second terminal 523 and the third terminal 524 respectively correspond to the first electrode terminal 221 and the free end 2322 of the conducting terminal 232, such that two ends of the spindle body 50 are respectively connected to the battery 20a and the battery 20b; certainly, the number of the spindle body 50 is not limited in the disclosure, and the spindle bodies 50 can be connected to each other according to user's requirements. Substantially, the structure of the spindle body 50 is the same as that of the battery 20 and capable of having the battery core 201. Please refer to FIG. 8A, in which in this embodiment, the first terminal 513, the second terminal 523, the third terminal 524 and the connecting member 525 is disposed out of the spindle member 53, but embodiments of the disclosure are not limited thereto; as shown in FIG. 8B, the spindle member 53 can be a hollowed tube, and conducting wires are applied to the first terminal 513, the second terminal 523, the third terminal 524 and the connecting member 525 for correspondingly inserting into the spindle member 53, such that the electrical connection therebetween are achieved.

Figure 10:
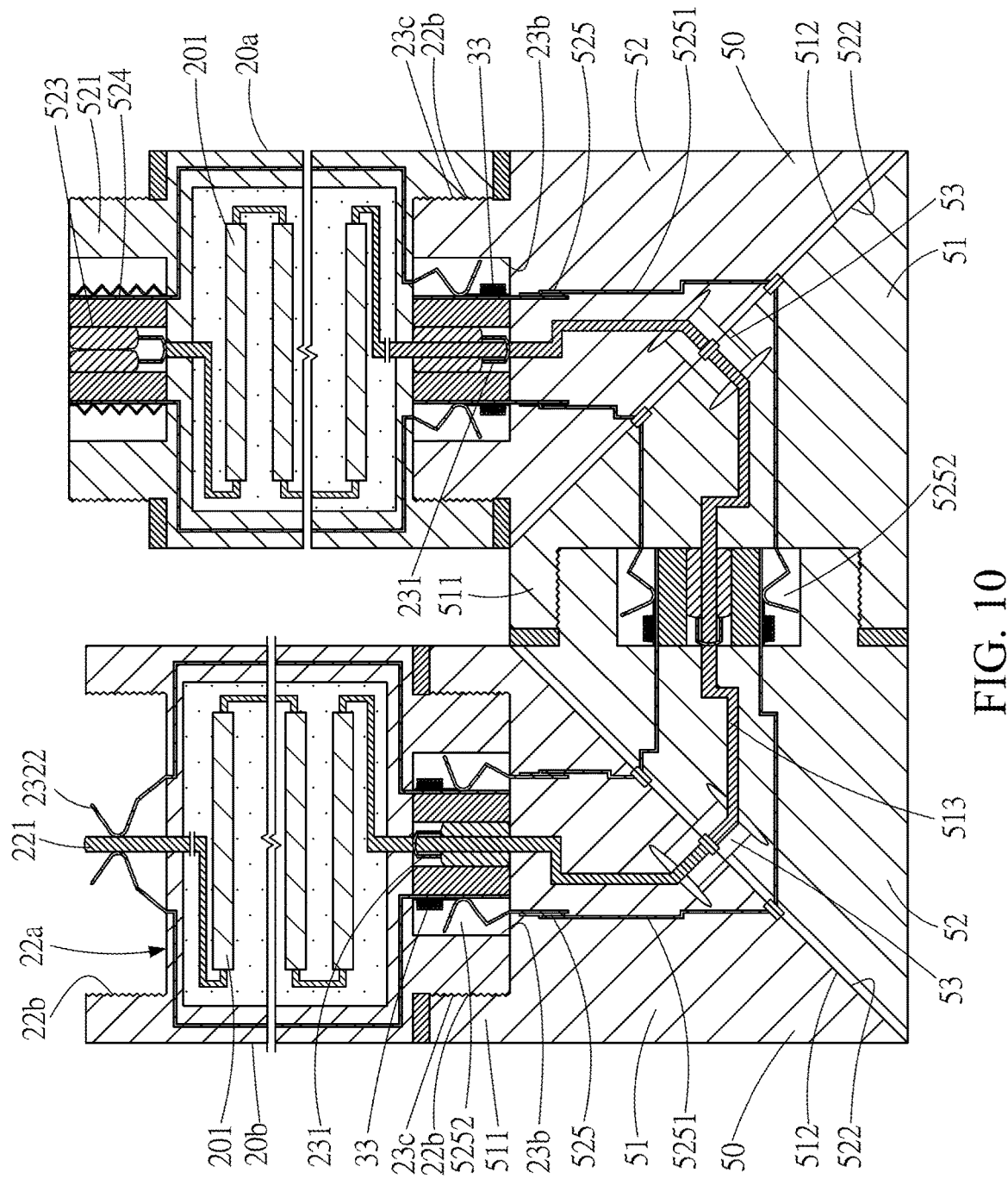
FIG. 10 is an operating schematic view (2) of the continuable power module of the third embodiment of the disclosure.

Please refer to FIGS. 7-10, in which in this embodiment, two ends of the spindle member 53 are respectively connected to the first rotating end 512 and the second rotating end 522, so that the first rotating end 512 is rotated relative to the second rotating end 522 via the spindle member 53, thereby causing the formation of the angled structure between the first combing end 511 of the first block body 51 and the second combining end 521 of the second block body 52. It is understood that, the first terminal 513 is connected electrically to the second terminal 523 via the spindle member 53, so that when the first block body 51 is rotated relative to the second block body 52, the electrical connection between the battery 20a connected electrically to the first terminal 513 and the movable end 5252 of the connecting member 525 and the battery 20b connected electrically to the second terminal 523 and the third terminal 524 is maintained. Based on this, via the spindle body 50, the included angle is defined between the battery 20a connected to the first block body 51 and the battery 20*b* connected to the second block body 52, thereby the continuable power module 400 of this embodiment is capable of presenting a bent structure. In one embodiment, the included angle is 90 degrees, but embodiments of the disclosure are not limited thereto, the structures and the outlines of the first block body 51, the second block body 52 and the spindle member 53 can be modified to adjust the included angle between the first block body 51 and the second block body 52; for instance, the spindle member 53 can be embodied by an universal joint structure. Additionally, the number of the spindle body 50 can be increased for achieving particular orientational relationship between the battery 20*a* and the battery 20*b*; as shown in FIG. 10, the included angle between the battery 20*a* and the battery 20*b* is 180 degrees.

Figure 11:
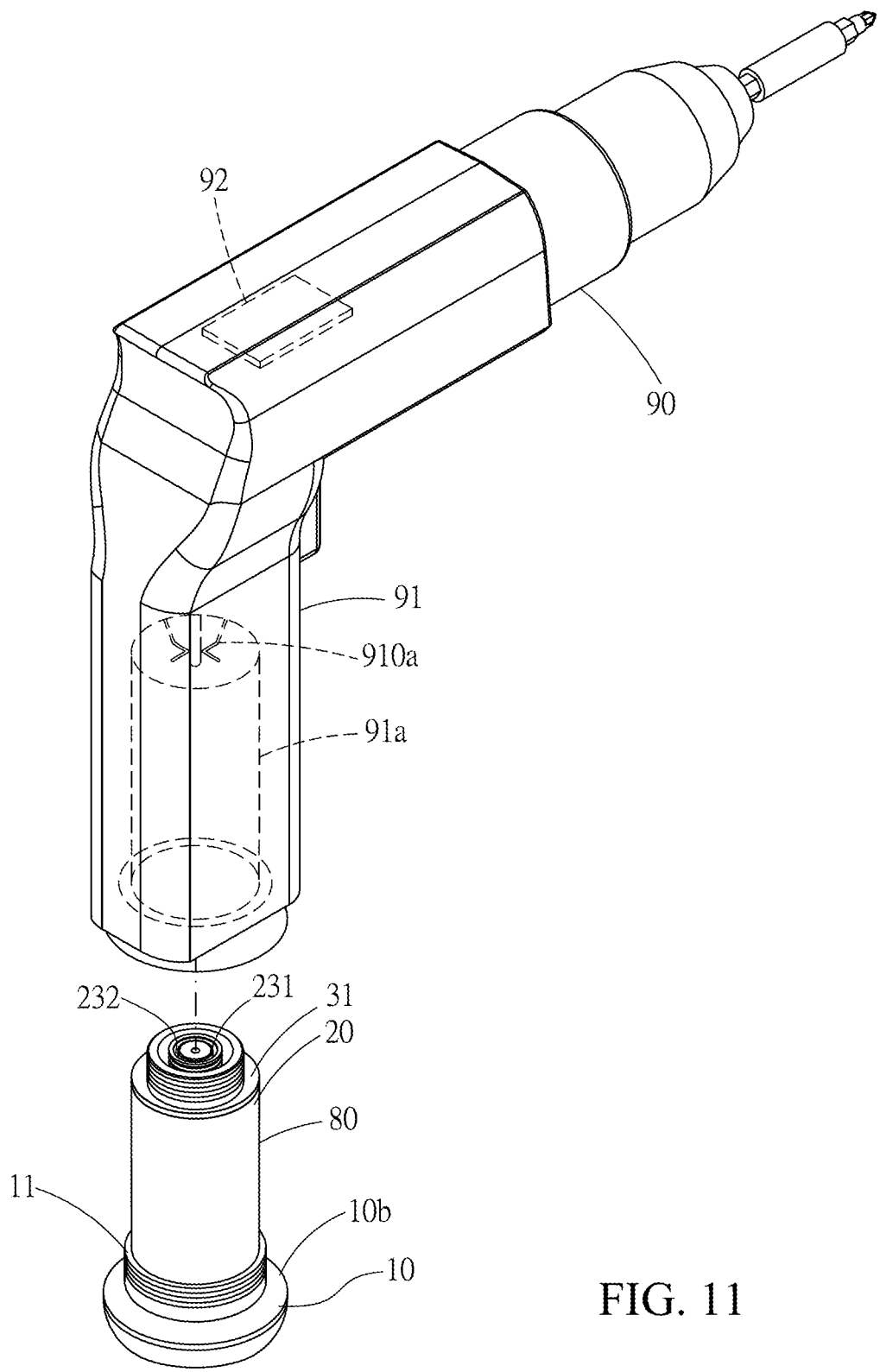
FIG. 11 is an exploded view of an electric device of a fourth embodiment of the disclosure.

Please refer to FIG. 11, which is an exploded view of an electric device 90 of a fourth embodiment of the disclosure. Here, the electric device 90 is an electric drill, but embodiments of the disclosure are not limited thereto. The electric device 90 includes a shell 91, a working circuit 92 and a continuable power module 80. The shell 91 has a battery receiving groove 91*a* for receiving the continuable power module 80. The battery receiving groove 91*a* includes a power accepting end 910*a*, and the structure of the power accepting end 910*a* matches that of the continuing end 23 of the continuable power module 80. That is, the structure of the power accepting end 910*a* is substantially the same as that of the connecting end 22 of the continuable power module 80, such that the detail features about the power accepting end 910*a* are omitted. The power accepting end 910*a* is connected electrically to the second electrode terminal 231 and the secured end 2321 of the conducting terminal 23 of the battery 20 of the continuable power module 80 in which the battery 20 is at the end of the continuable power module 80. The working circuit 92 is disposed in the shell 91 and connected electrically to the power accepting end 910*a* for providing the functions of the electric device 90.

Figure 12:
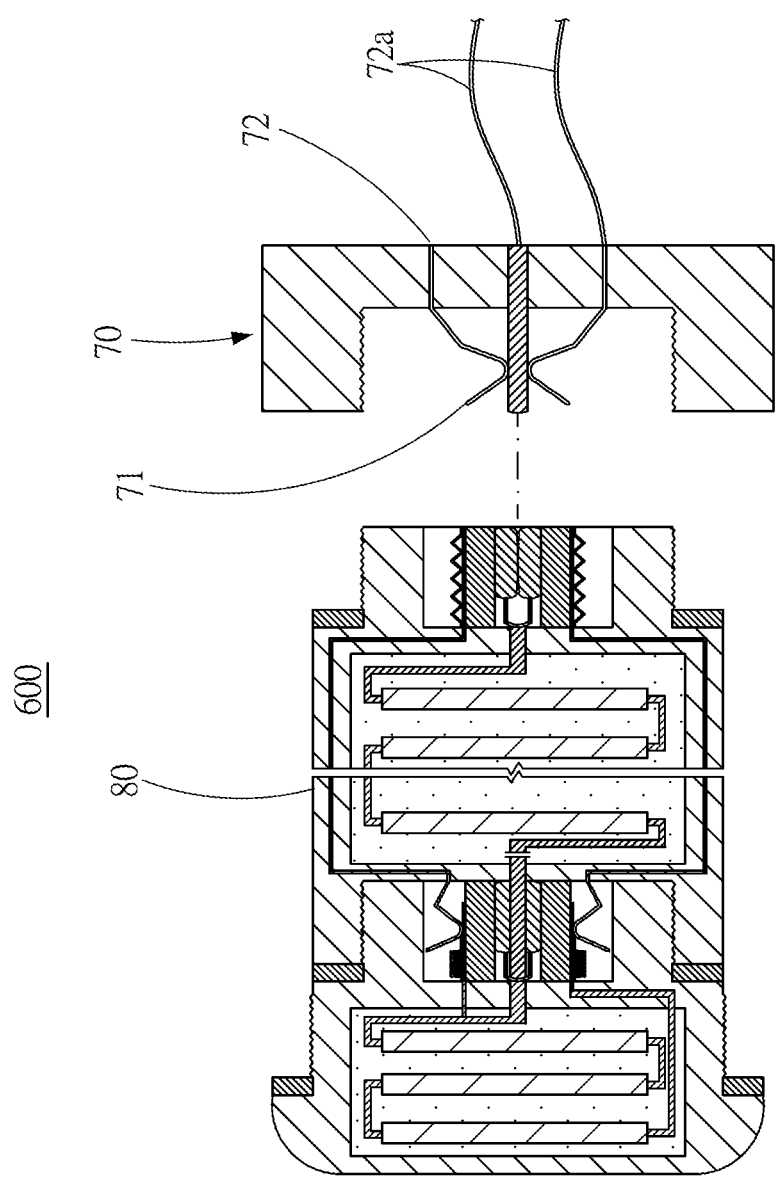
FIG. 12 is an exploded view of a continuable power assembly of a fifth embodiment of the disclosure.

Please refer to FIG. 12, which is an exploded view of a continuable power assembly 600 of a fifth embodiment of the disclosure. The continuable power assembly 600 includes a continuable power module 80 and an adapting member 70. Here, the continuable power module 80 includes a battery 20 and a base member 10, but embodiments of the disclosure are not limited thereto. The adapting member 70 has an adapting end 71 and a power supplying end 72. The structure of the adapting end 71 matches that of the continuing end 23 of the continuable power module 80, so that the adapting end 71 can be connected to the continuing end 23 of the battery 20 of the continuable power module 80 in which the battery 20 is at the end of the continuable power module 80; that is, the structure of the adapting end 71 is substantially the same as that of the connecting end 22 of the continuable power module 80. The power supplying end 72 has a plurality of wires 72*a* (here, the power supplying end 72 has two wires 72*a*), capable of electrically connecting with an electric device (not shown). As shown in FIG. 12, the adapting end 71 has a first adapting terminal and a second adapting terminal. The first adapting terminal is correspondingly connected electrically to the second electrode terminal 231 of the continuable power module 80, while the second adapting terminal is correspondingly connected electrically to the secured end 2321 of the conducting terminal 232 of the continuable power module 80. In this case, one of the wires 72*a* is connected electrically to the first adapting terminal, and the other wire 72*a* is connected electrically to the second adapting terminal. Based on this, the two wires 72*a* are respectively connected electrically to the second electrode terminal 231 and the secured end 2321 of the conducting terminal 232 of the battery 20 which is connected to the adapting end 71.

Please refer to FIG. 11 and FIG. 12, in which in addition to connecting electrically with the electric device 90 via the battery receiving groove 91, the continuable power module 80 can be also connected electrically to a power receiving end (not shown), of the electric device 90 via the adapting member 70. For example, the power receiving end can be an USB connecting port, and one ends of the wires 72*a* are connected to terminal structures which are compatible with the USB connecting port, so that the adapting end 71 is connectable with the USB connecting port.

As above, the disclosure provides a continuable power module in which the battery 20 thereof can be connected to each other. The number of the batteries 20 of the continuable power module can be altered so as to adjust the outputted voltage to match with the operating voltage of the electric appliance. Additionally, the disclosure is waterproofed, so that the electric appliances applied thereto can be operated under water or on rainy days, thereby enhancing the usefulness of the electric appliances. Furthermore, via the application of the spindle body 50, the continuable power module is bendable, twistable and foldable, so that the continuable power module can be even received in irregular and small spaces.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A terminal assembly, comprising:
   a male terminal structure, comprising:
      a male terminal body;
      a first terminal member, disposed at an end portion of the male terminal body; and
      a free terminal member, detachably connected to the first terminal member; and
   a female terminal structure, comprising:
      a female terminal body;
      a second terminal member, disposed at an end portion of the female terminal body, wherein a structure of the second terminal member matches with a structure of the first terminal member, so that the second terminal member is connectable to the first terminal member; and
      a secured terminal member, disposed at an end portion of the female terminal body and spaced from the second terminal member;
   wherein, when the male terminal structure is connected to the female terminal structure, the first terminal member is connected to the second terminal member, and the second terminal member pushes the free terminal member apart from the first terminal member, so that the free terminal member is connected to the secured terminal member.

2. The terminal assembly according to claim 1, wherein the male terminal structure comprises:
   a positioning portion, recessed at a center of the male terminal body for receiving the first terminal member and the free terminal member; and a positioning structure, annularly disposed at an inner wall of the positioning portion; wherein the female terminal structure comprises:
  a limiting portion, protruded from a center of the female terminal body for matching with the positioning portion of the male terminal structure;
  a void, disposed at a center of the limiting portion for receiving the second terminal member and the secured terminal member; and
  a limiting structure, annularly disposed at an outer wall of the limiting portion for matching with the positioning structure of the male terminal structure.

3. The terminal assembly according to claim 1, wherein the male terminal structure comprises:
  a limiting portion, protruded from a center of the male terminal body;
  a void, disposed at a center of the limiting portion for receiving the first terminal member and the free terminal member; and
  a limiting structure, annularly disposed at an outer wall of the limiting portion; wherein the female terminal structure comprises:
    a positioning portion, recessed at a center of the female terminal body for receiving the second terminal member and the secured terminal member and matching with the limiting portion of the male terminal structure; and
    a positioning structure, annularly disposed at an inner wall of the positioning portion for matching with the limiting structure of the male terminal structure.

4. The terminal assembly according to claim 1, further comprising a waterproof elastomer at the female terminal body and placed within the second terminal member, wherein the waterproof elastomer defines a channel therethrough, the inner diameter of the channel is less than the outer diameter of the first terminal member, wherein when the male terminal structure is connected to the female terminal structure, the first terminal member is inserted into the channel of the waterproof elastomer, and the periphery of the first terminal member is enclosed by the inner wall of the channel of the waterproof elastomer.

5. The terminal assembly according to claim 1, further comprising a flexible compressible member fitted over the secured terminal member, wherein when the male terminal structure is connected to the female terminal structure, the flexible compressible member is compressed inward along the secured terminal member.

6. The terminal assembly according to claim 1, further comprising an insulating member, disposed between the second terminal member and the secured terminal member.

7. A power module, comprising:
  the terminal assembly according to claim 1;
  a first battery connected with the male terminal structure; and
  a second battery connected with the female terminal structure.

8. The power module according to claim 7, further comprising a second waterproof member, disposed between the first battery and the second battery.

9. The power module according to claim 7, wherein the male terminal body of the terminal assembly comprises:
  a positioning portion, recessed at a center of the male terminal body for receiving the first terminal member and the free terminal member; and
  a positioning structure, annularly disposed at an inner wall of the positioning portion; wherein the female terminal body of the terminal assembly comprises:
    a limiting portion, protruded from a center of the female terminal body for matching with the positioning portion of the male terminal body;
    a void, disposed at a center of the limiting portion for receiving the second terminal member and the secured terminal member; and
    a limiting structure, annularly disposed at an outer wall of the limiting portion for matching with the positioning structure of the male terminal body.

10. The power module according to claim 7, further comprising a waterproof elastomer, disposed in the second terminal member of the terminal assembly.

11. The power module according to claim 7, further comprising a flexible compressible member fitted over the secured terminal member, wherein when the female terminal body is connected to the male terminal body, the flexible compressible member is compressed inward along the secured terminal member.

12. The power module according to claim 7, further comprising an insulating member disposed between the second terminal member and the secured terminal member of the terminal assembly.

13. The power module according to claim 7, further comprising a base member, the base member comprising:
  a base body, comprising a linking end;
  a first contacting terminal, disposed at the linking end, a structure of the first contacting terminal being substantially the same as the structure of the second terminal member and matching with the structure of the first terminal member;
  a second contacting terminal, disposed at the linking end and connected electrically to the first contacting terminal, a structure of the second contacting terminal being substantially the same as a structure of the secured terminal member and matching with a structure of the free terminal member; and
  a battery core connected electrically to the first contacting terminal and the second contacting terminal.

14. A spindle body, comprising:
  the terminal assembly according to claim 1;
  a first block body connected with the male terminal member;
  a second block body connected with the female terminal member; and
  a spindle member, wherein two ends of the spindle member are respectively connected to the first block body and the second block body.

15. An electric device, comprising:
  a shell, comprising a battery receiving groove;
  a working circuit, disposed in the shell; and
  a power module, comprising:
    a battery comprising the terminal assembly according to claim 1;
    wherein the power module is disposed in the battery receiving groove, the working circuit is connected electrically to the power module.

* * * * *